United States Patent
Nakano et al.

(10) Patent No.: US 7,421,110 B2
(45) Date of Patent: Sep. 2, 2008

(54) IMAGE PROCESSING UNIT FOR WAFER INSPECTION TOOL

(75) Inventors: Michio Nakano, Hitachinaka (JP); Shigeya Tanaka, Hitachi (JP); Yoshiyuki Momiyama, Hitachinaka (JP); Takashi Hiroi, Yokohama (JP); Kazuya Hayashi, Hitachinaka (JP); Dai Fujii, Tokai (JP); Takako Fujisawa, Tokai (JP); Atsushi Ichige, Hitachinaka (JP); Ichiro Kawashima, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 725 days.

(21) Appl. No.: 10/780,752

(22) Filed: Feb. 19, 2004

(65) Prior Publication Data
US 2004/0170313 A1    Sep. 2, 2004

(30) Foreign Application Priority Data
Feb. 28, 2003    (JP)    ............... 2003-052239

(51) Int. Cl.
*G06K 9/00*    (2006.01)

(52) U.S. Cl. ............... 382/145; 382/144; 382/152; 382/218

(58) Field of Classification Search ............... 382/144, 382/145, 151, 218, 152
See application file for complete search history.

(56) References Cited

U.S. PATENT DOCUMENTS

| | | | | |
|---|---|---|---|---|
| 6,136,517 | A * | 10/2000 | Fletcher | 430/394 |
| 6,738,503 | B1 * | 5/2004 | Sakaue et al. | 382/145 |
| 6,838,667 | B2 * | 1/2005 | Tsuneta et al. | 250/306 |
| 6,898,304 | B2 * | 5/2005 | Naftali et al. | 382/149 |
| 7,106,895 | B1 * | 9/2006 | Goldberg et al. | 382/144 |
| 2003/0053675 | A1 * | 3/2003 | Kuwabara | 382/145 |
| 2004/0170313 | A1 * | 9/2004 | Nakano et al. | 382/145 |
| 2004/0188609 | A1 * | 9/2004 | Miyai et al. | 250/310 |

FOREIGN PATENT DOCUMENTS

| | | |
|---|---|---|
| JP | 6-325162 | 11/1994 |
| JP | 11-259434 | 9/1999 |
| JP | 3185342 | 5/2001 |

* cited by examiner

*Primary Examiner*—Gregory M Desire
(74) *Attorney, Agent, or Firm*—Dickstein Shapiro LLP

(57) ABSTRACT

An image processing apparatus for wafer inspection tool that is able to perform continuously cell to cell comparison inspection, die to die comparison inspection, and cell-to-cell and die-to-die hybrid comparison inspection, employing a plurality of processors. This image processing apparatus for wafer inspection tool comprises a plurality of processors for performing parallel processing, means for cutting out image data including a forward end overlap and a rear end overlap at partition boundaries in order to cut serial data into a predetermined image size, means for distributing the cutout image data to the plurality of processors, and means for assembling results of processing performed by the plurality of processors. The forward end overlap is set greater than a pitch of the cell subject to cell to cell comparison inspection.

8 Claims, 21 Drawing Sheets

D2 Cutout image

D10 Cutout image

Die to die comparison inspection

Cell to cell comparison inspection

IMAGE PROCESSING UNIT FOR WAFER INSPECTION TOOL

FIELD OF THE INVENTION

The present invention relates to an image processing apparatus for processing image data in visual inspection of objects.

BACKGROUND OF THE INVENTION

As a typical example of visual inspection apparatus, an apparatus is known which, in order to detect defects in circuit patterns formed on a semiconductor wafer, obtains an image of a circuit pattern, compares the image with a reference image as the criterion of inspection, and extracts defects by difference between these images. In this relation, there is also a known method which uses as a reference image that just precedes the inspection image and such reference image is changed to the next one in turn. This method can be applied if the circuitry patterns to be inspected are identical and repeated in all the inspection images. In some cases circuitry patterns of chips produced on a semiconductor wafer are identical and repeated, while in other cases identical repeated circuitry patterns are produced on a chip. Comparison inspection in the former cases is called "die to die comparison inspection" and that in the latter cases is called "cell to cell comparison inspection".

Such visual inspection apparatus obtains an image of an object under inspection and performs visual inspection or defect extraction by using an image processing apparatus. FIG. 17 is a functional block diagram showing a typical structure of an image processing unit of visual inspection apparatus for semiconductor wafer defect inspection.

In FIG. 17, a wafer 1702 that is an object under inspection is set in position on a wafer stage 1701. As the wafer stage is moved in X or Y directions, digital image data can be obtained by a sensor 1703 and an AD circuit 1704. The digital image input data is processed by an image processing unit 1705 to detect defects and the detected defect data is stored on an overall control computer 1706.

FIG. 18 shows semiconductor wafer top views for explaining a die to die comparison inspection system and a cell to cell comparison inspection system which are performed by the image processing unit 1705 of the visual inspection apparatus. Although both the term "die" and the term "chip" mean the same thing, the "die" is used herein when referring to the die to die comparison inspection; otherwise, the "chip" is used.

On the wafer 1702 to be inspected, a plurality of dice 1801 which have been fabricated in the manufacturing process are arranged in a grid. The die is a chip as individual semiconductor device. For simplifying purpose, chips n−1, n, n+1, and n+2 are enlarged in FIG. 18A. The apparatus obtains serial image data having a given width in the scanning direction. A die to die comparison inspection system is configured to compare neighboring chips in grid arrangement on the wafer 1702. For example, if an image of chip n is inspected, the image of the chip n−1 is used as a reference image. This comparison is repeated in turn as shown until the entire surface of the wafer is scanned, so that all the defects on the wafer can be detected.

On the other hand, the cell to cell comparison inspection system is configured to compare the repeated patterns which are called cells, like memory mats in one chip, as shown in FIG. 18B. For example, if an image of a particular cell on chip n is inspected, the image of the cell just preceding the particular cell on the same chip is used as the reference image for comparison.

By selecting the inspection condition to set the entire surface. Of memory mats on a wafer as inspection target area, not only the die to die comparison inspection but also the cell to cell comparison inspection can be performed.

The die to die comparison inspection system is applied to logic chips and the like. The cell to cell comparison inspection system is applied to memory chips and the like. Recently, a need for performing both of the cell to cell comparison inspection and the die to die comparison inspection simultaneously has arisen for mixed memory and logic chips.

FIG. 19 is a functional block diagram showing a configuration of the image processing unit 1705 of the visual inspection apparatus shown in FIG. 17, wherein the configuration is based on prior art that enables cell to cell and die to die hybrid comparison inspection.

Image data obtained through the sensor 1903 and the AD circuit 1904 is input to both a die to die comparison unit 1901 and a cell to cell comparison unit 1902. In the die to die comparison unit 1901, a chip delay circuit 1905 prepares the reference image of the chip just preceding a chip whose image data has now been obtained. A position correction and intensity correction circuit 1906 performs position correction to align the corresponding positions of the inspection image and the reference image, and compensates the difference in intensity between the two images. A differential image computing unit 1907 extracts the difference in intensity between the two images and a feature extraction computing unit 1908 detects feature quantities such as intensity, dimensions, and shape of defect extracted from intensity difference data and positional data. Such feature quantities are stored as defect data in the overall control computer 1909.

The cell to cell comparison unit 1902 is comprised of almost the same elements as the die to die comparison unit 1901, but differs from the die to die comparison unit 1901 in that it includes a cell delay circuit 1910 instead of the chip delay circuit 1905 to prepare the reference image of the cell just preceding a cell whose image data has now been obtained.

In the visual inspection apparatus, image signals are digitized and processed in a sequence of process steps comprising storing a captured die or cell inspection image and its reference image into a memory, comparing these two images, and extracting defects. However, because of a great amount of image data and insufficient processor capability, there has arisen a need to improve the speed of defect extraction.

Due to the improvement of processing capability of processors in recent years, an image processing apparatus of parallel data processing type employing a plurality of processor elements (abbreviated to PE in the relevant drawings) has been proposed (for example, refer to Japanese Patent Document 1).

FIG. 20 is a schematic diagram showing a conventional image processing apparatus configuration. Reference numeral 2001 denotes a data input block; 2002 denotes a process distribution block; 2003 denotes a status management block; 2004 denotes an output block; 2005 denotes a communications bus; and 2006 through 2009 denote processor elements (PEs (0) to (n)). In association with parallel processing of image data in this circuitry topology, a method for setting the sequence of distribution of input data to a plurality of processors is known. FIG. 21 is a diagram of operation sequence of the processors, which shows an example of data distribution to the four processors. Image data are distributed as unit image data to the processors in sequence so that the processors operate to process the unit image data in order. The first one unit image data of every one block consisting of four unit image data, for example, D1, D5, D9 of serial image data 2101 are distributed to and processed by the processor element PE (0). In FIG. 21, hatching area represents processing time of unit image data. Unit image data D2, D6, D10, etc. are distributed to the processor element PE (1). Unit image data D1, D7, etc. are distributed to the processor element PE (2). Unit image data D4, D8, etc. are distributed to the processor element PE (3).

In this parallel processing, the interval at which each processor element processes unit image data is determined by the processing time of unit image data and the throughput of input image. In general, the higher is the speed of capturing image input data, at the shorter intervals, unit image data are captured, and accordingly, the more processor elements are necessary.

When serial image data is partitioned into unit image data, input image adjustment or the like is performed by differential processing and position correction processing at the ends of unit image data. Consequently, there is a possibility that an area where it is impossible to perform operation processing is generated at the boundary between contiguous unit image data. As practical countermeasures against this problem, it is conceivable to divide unit image data at the boundary into a plurality of partitions so that partitions of contiguous image data are overlapped with each other (For example, refer to Japanese Patent Document 2). At the boundary between contiguous unit image data, for example, between unit image data D1 and D2 in FIG. 21, by overlapping the pixels of the area where it is impossible to perform operation processing and which is predicted from operation processing, it can prevent such an area from occurring.

By thus providing overlapped margins at the boundaries between contiguous unit image data and avoiding such an area where it is impossible to perform operation processing, all the unit image data can be inspected by die to die comparison inspection. In the case of cell to cell comparison inspection, however, data segments that cannot be inspected may take place as described below. Besides the inspection image, a reference image of the cell preceding the inspection cell is necessary in cell to cell comparison inspection. However, if, for example, the image of a cell to be inspected is positioned at the beginning of unit image data D2 which is processed by the processor element PE (1) in FIG. 21, the image of the preceding cell as the reference image does not exist in the data D2 and it becomes impossible to inspect this cell. Like this, image data distribution generates such an area that it is impossible to perform cell to cell comparison inspection.

[Japanese Patent Document 1]
JP-A No. 259434/1999 (p.6, FIG. 5)

[Japanese Patent Document 2]
JP-A No. 325162/1994 (p.3, FIG. 2)

SUMMARY OF THE INVENTION

An object of the present invention is to provide an image processing apparatus which is capable of continuously performing "cell to cell comparison inspection", "die to die comparison inspection", and "cell-to-cell and die-to-die hybrid comparison inspection", employing a plurality of processors.

In order to solve the above-noted problem and in accordance with an aspect of the present invention, an image processing apparatus of the present invention comprises a plurality of processors for performing parallel processing, means for cutting serial image data into a plurality of cutout image data each including a forward end overlap and a rear end overlap at boundaries and having a predetermined data size, means for distributing cutout image data to the plurality of processors, and means for assembling results of processing performed by the plurality of processors. By setting the forward end overlap greater than a cell pitch size of cell to cell comparison inspection, continuous inspection across the partition boundaries can be performed.

Moreover, the means for cutting serial image data into a plurality of cutout image data has a function to cut out cutout image data having the forward end overlap and the rear end overlap, according to a line address representing the starting of cutout image data and a cutout width. By setting the line address to be less by the forward end overlap than the partition boundary, and setting the cutout width to be the sum of the cut out image data size, the forward end overlap and the rear end overlap, continuous inspection can be performed even across the partition boundaries.

DETAILED DESCRIPTION OF THE PREFERRED EMBODIMENTS

Preferred embodiments of the present invention will be described hereinafter, referring to the accompanying drawings.

Figure 1:
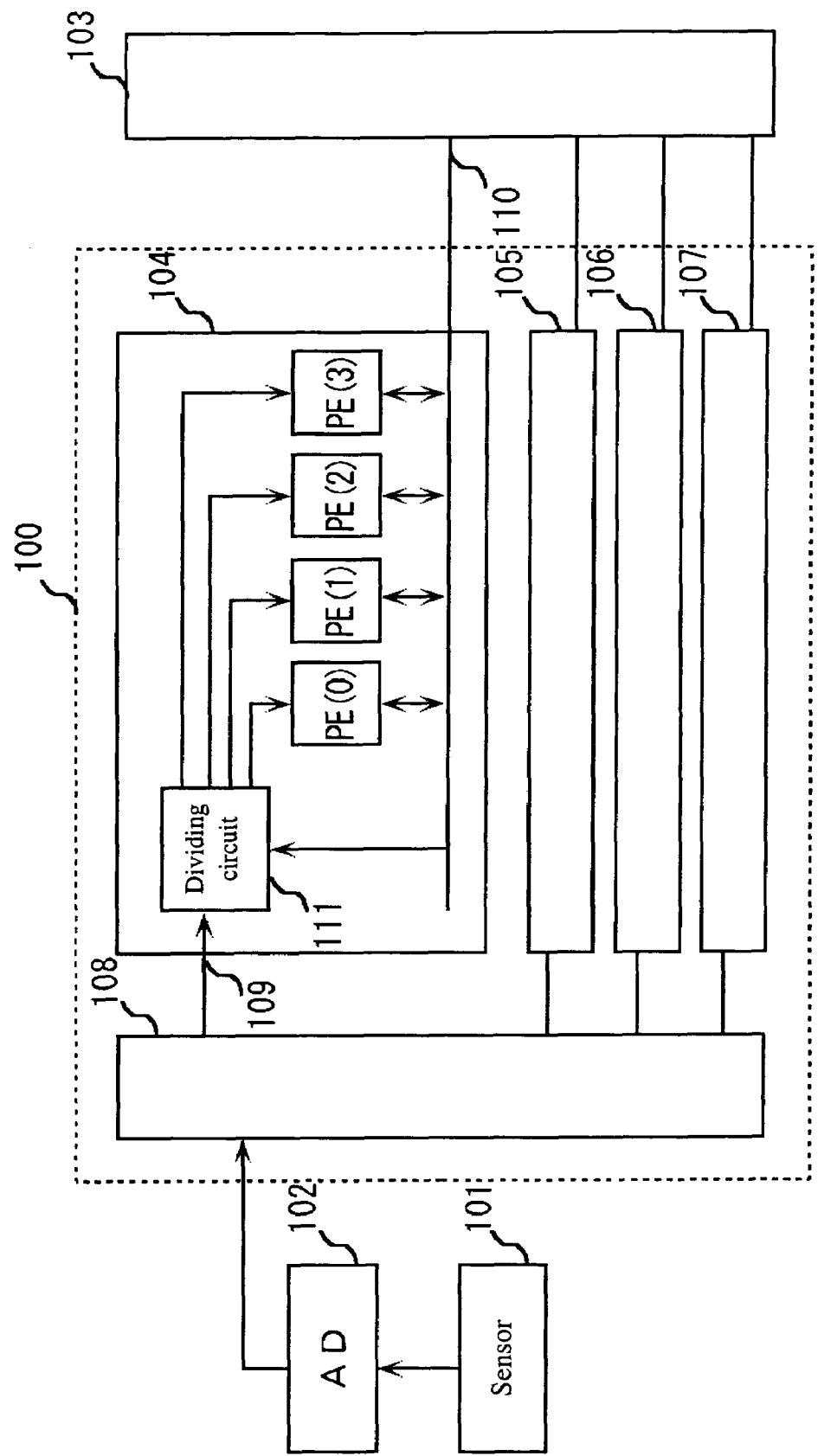
FIG. 1 is a diagram showing a configuration of an image processing apparatus according to the present invention.

FIG. 1 is a diagram showing a configuration of an image processing apparatus 100 according to a preferred embodiment of the present invention. A sensor 101 is an image detecting unit for detecting two-dimensional image data (for example, image data captured by a line sensor of 640 pixel width). Input image data captured by the sensor 101 is digitized by an AD circuit 102 and input to the image processing apparatus 100. The image processing apparatus 100 comprises a plurality of processors. The image processing apparatus 100 cuts the serial image data into a plurality of basic image units, each having a predetermined width and allocates the basic image units to the plurality processors to carry out defect inspection. A overall control computer 103 performs storing detected defect data, setting parameters of inspection (a recipe) to the image processing apparatus prior to inspection, displaying and analyzing images, exchanging data with other devices, and other operations.

The image processing apparatus 100 is comprised of a channel dividing unit 108, a channel 1 image processing unit 104, a channel 2 image processing unit 105, a channel 3 image processing unit 106, and a channel 4 image processing unit 107, for processing image data allocated into each channel.

Figure 2:
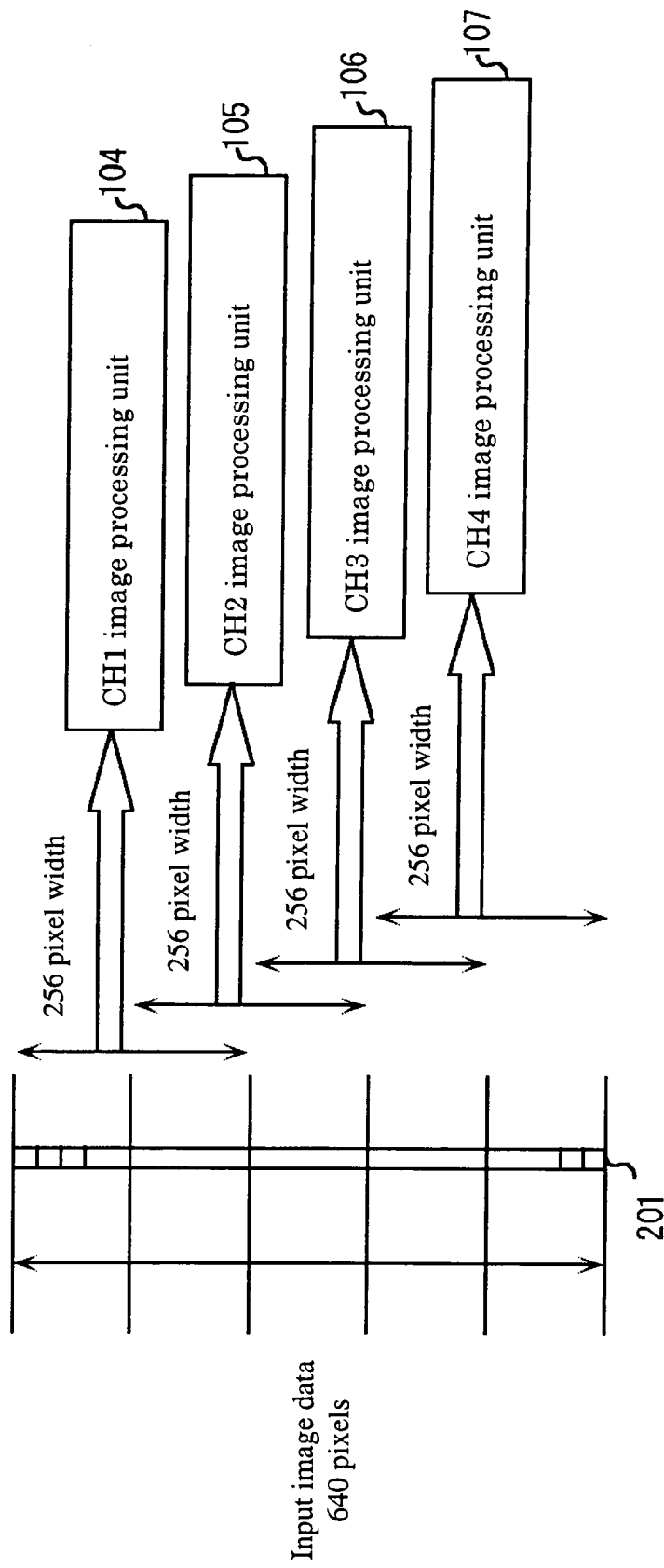
FIG. 2 is a diagram explaining a method for cutting serial image data into channels in terms of pixels.

FIG. 2 is a diagram for explaining a method for dividing input image data into the channels in terms of pixels. The channel dividing unit 108 shown in FIG. 1 has a function to divide input image data with input width of 640 pixels into four channels, each having 256 pixels, as shown in FIG. 2. 128 pixels are overlapped. Of input image data 201 with a 640 pixel width, serial data with a 256 pixel width, consisting of the first to 256th pixels, is distributed to the channel 1 image processing unit 104, serial data with a 256 pixel width, consisting of the 129th to 384th pixels, is distributed to the channel 2 image processing unit 105, serial data with a 256 pixel width, consisting of the 257th to 512th pixels, is distributed to the channel 3 image processing unit 106, serial data with a 256 pixel width, consisting of the 385th to 640th pixels, is distributed to the channel 4 image processing unit 107.

Returning to FIG. 1, the channel 1 image processing unit 104, channel 2 image processing unit 105, channel 3 image processing unit 106, and channel 4 image processing unit 107 to which serial image data with a 256 pixel width is input have the same functional. Each of the channel 1 image processing unit 104, channel 2 image processing unit 105, channel 3 image processing unit 106, and channel 4 image processing unit 107 have a function to distribute the cutout images cut out from basic image data unit by a divider circuit 111 to the four processor elements PE (0), PE (1), PE (2), and PE (3). The processor element performs a processing of determining defects to the cutout images from basic image data unit. The detected defects are transmitted through a bus 110 to the overall control computer and stored on the overall control computer.

Defect data from all the processor elements which perform processings of image data in basic units are assembled to generate defect data with regard to serial image data with a 256 pixel width.

Figure 3:
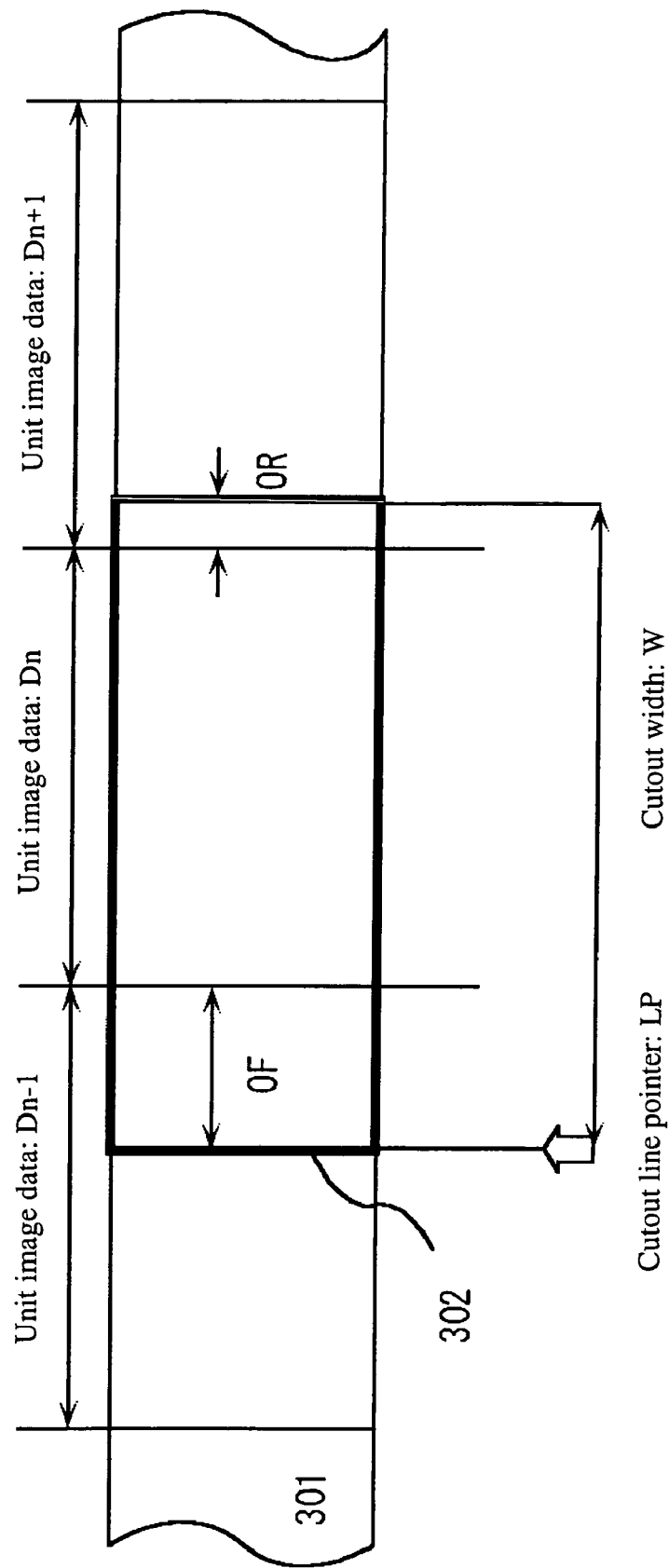
FIG. 3 is a diagram explaining a method for cutting serial image data into a plurality of unit image data.
Figure 4:
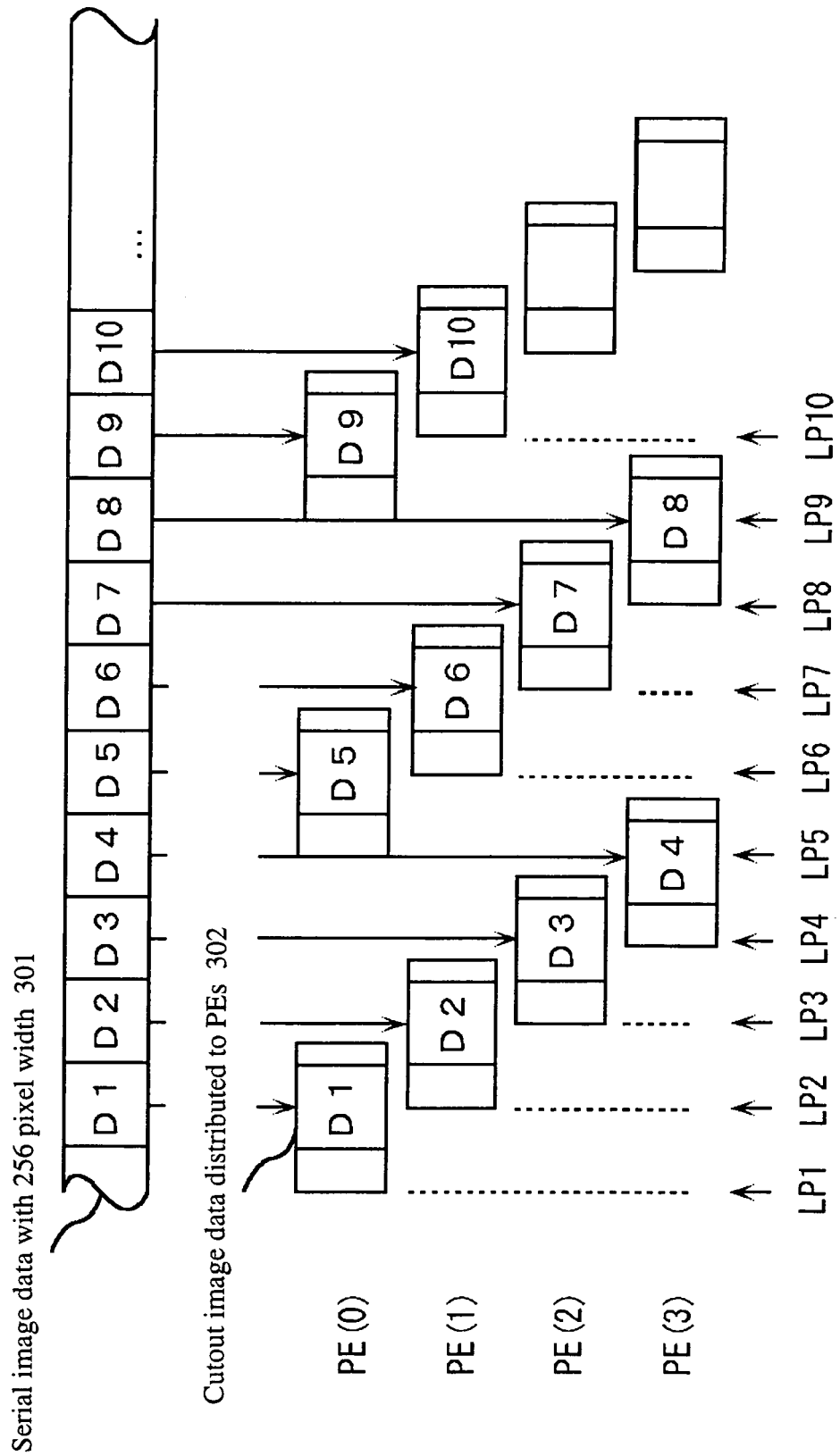
FIG. 4 is a diagram of an operation sequence of processors.

FIG. 3 is a diagram for explaining a method for cutting serial image data and FIG. 4 is a diagram of operation sequence of the processors. In FIG. 3, reference numeral 301 denotes serial image data with a 256 pixel width and an enlarged view of unit image data Dn−1, Dn, and Dn+1 is shown wherein the basic image data unit is assumed to be a 256 pixel width×1024 lines. When cutting out a unit image data Dn from serial image data, overlap margins for operation processing must be added as has been known. Overlap margins in the channel direction are sufficiently as explained in FIG. 2 and therefore the description regarding this is omitted. Hereinafter, only overlaps in the cutout direction are discussed. If an overlap of the Dn with the preceding unit image data Dn−1 is defined as a forward end overlap OF and an overlap of the Dn with the following unit image data Dn+1 is defined as a rear end overlap OR, the size of the cutout image Dn is 256 pixel width×(forward end overlap OF+unit image data Dn+rear end overlap OR). The forward end overlap OF is the sum of an overlap margin for operation processing and a cell pitch size, and the rear end overlap OR is an overlap margin for operation processing.

Examples of concrete values of these overlaps are given below. Supposing that the size of unit image is 1024 pixels, a known overlap margin for operation processing is 32 pixels, and the cell pitch for cell to cell comparison is 256 pixels, the forward end overlap OF is 32+256, hence, 288 pixels, and the rear end overlap OR is 32 pixels. Therefore, the size of cutout image is 256 pixel width×(288+1024+32).

As is obvious from the present embodiment, a feature of the present invention is that the forward end overlap OF of unit image data is greater by a cell pitch size than the overlap required as an overlap margin for operation processing. Because a recipe as an inspection condition differs wafer by wafer, it is possible to calculate the forward end overlap value OF which depends on the cell pitch size, based on the maximum cell pitch size determined by the specifications of equipment.

A line counter controls the position of serial image in the line direction on the coordinates having an origin at a chip boundary. The cutout image can be represented by a cutout line pointer LP and a cutout width W, as shown in FIG. 3. The cutout image including unit image data Dn is defined by the value of the cutout line pointer LP of "n×1024−forward end overlap OF" and the value of the cutout width W of "forward end overlap OF+1024+rear end overlap OR". An example of concrete values is given below. If n=3, the cutout image is defined by the value of cutout line pointer LP "3×1024−288=2784" and the cutout width W of 1344. If n=4, the cutout image is defined by the value of cutout line pointer LP "4×1024−288=3808" and the cutout width W of 1344.

FIG. 4 is a diagram of operation sequence of the processors, which is a time chart representing a method for distributing cutout images cut out from serial image data to the processors. Reference numeral 301 denotes serial image data having a 256 pixel width and unit image data is represented by D1, D2, D1, and so on. Reference numeral 302 denotes cutout image data distributed to the processor elements, each cutout image including the forward end overlap OF and the rear end overlap OR. According to timing sequence shown in FIG. 4, cutout image distribution operation is performed to distribute a cutout image data comprising unit image data D1 to the processor element PE (0), a cutout image data comprising unit image data D2 to the processor element PE (1), a cutout image data comprising unit image data D3 to the processor element PE (2), a cutout image data comprising unit image data D4 to the processor element PE (3), a cutout image data comprising unit image data D5 to the processor element PE (0), a cutout image data comprising unit image data D6 to the processor element PE (1), a cutout image data comprising unit image data D7 to the processor element PE (2), a cutout image data comprising unit image data D8 to the processor element PE (3), a cutout image data comprising unit image data D9 to the processor element PE (0), a cutout image data comprising unit image data D1 to the processor element PE (1), and so on. Cutting out the cutout image data from the serial image data 301 can be performed, based on cutout line pointers LP1, LP2, LP3, etc. representing head lines of cutout image data and a cutout width W.

Figure 5:
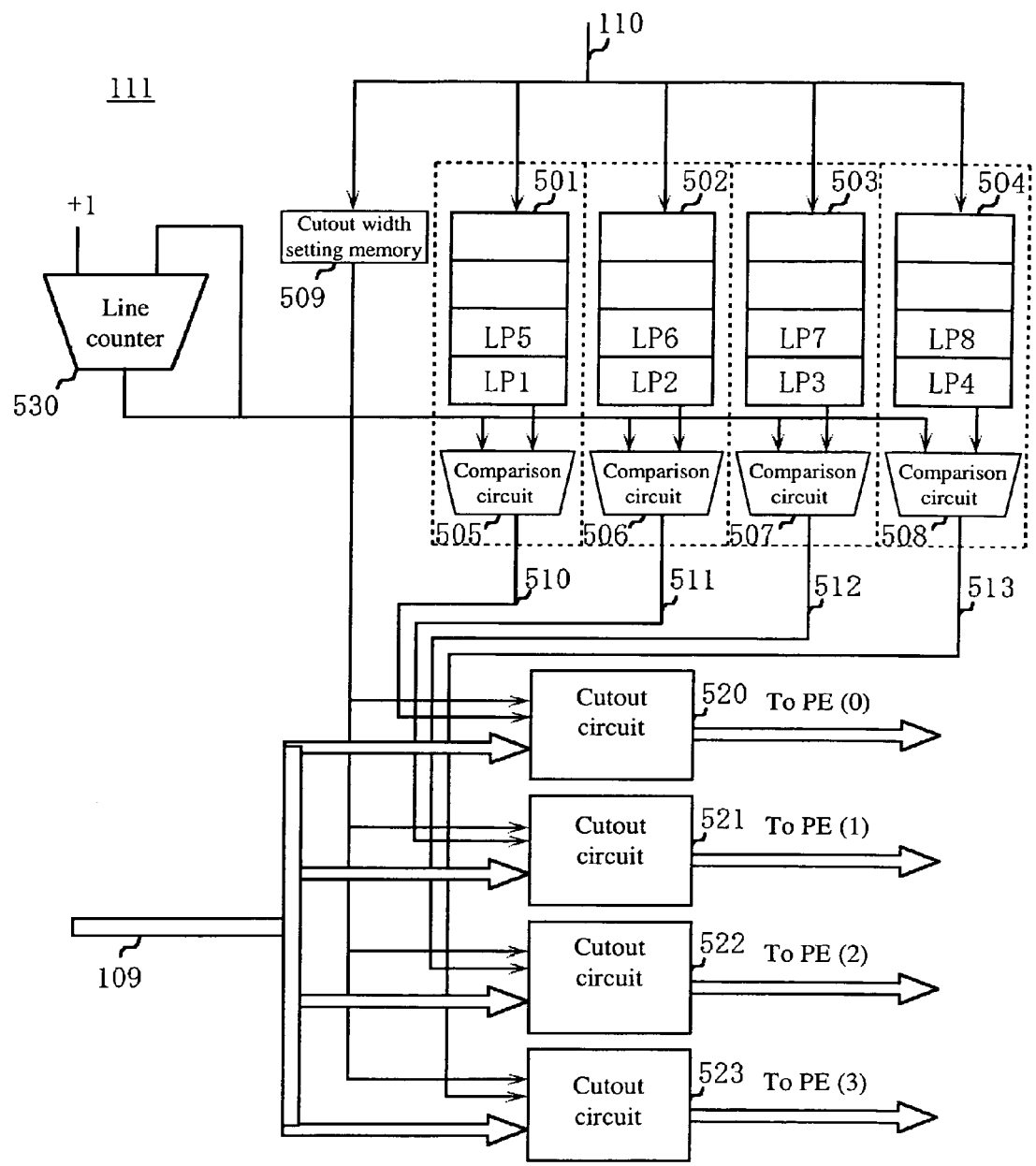
FIG. 5 is a diagram showing a configuration of a divider circuit.

FIG. 5 is a diagram of configuration of divider circuit. The divider circuit 111 has a function to cut out the cutout image data from serial image data and distribute the cutout images to predetermined processors. Reference numeral 109 denotes a path through which serial image data is simultaneously input to cutout circuits 520, 521, 522, and 523 which are provided for the processor elements, respectively. Cutout starting signals 510, 511, 512, and 513 and cutout width W which has been set on a cutout width setting memory 509 are input to the cutout circuits. The cutout circuits have functions to output the cutout width W from the image data that the cutout starting signals 510, 511, 512, and 513 are asserted.

Prior to inspection, from information including the overlap margins for operation processing, the recipe, and the cell pitch size, the values of the cutout line pointers LP1, LP2, LP3, etc. are calculated, according to the principle described above. Then, the cutout image data are allocated to the processor elements and are stored in memories of the processor elements. For example, the value of the cutout line pointer LP1 is stored into a memory 501, the value of the cutout line pointer LP2 is stored into a memory 502, the value of the cutout line pointer LP3 is stored into a memory 503, the value of the cutout line pointer LP4 is stored into a memory 504, the value of the cutout line pointer LP5 is stored into the memory 501, the value of the cutout line pointer LP6 is stored into the memory 502, the value of the cutout line pointer LP7 is stored into the memory 503, the value of the cutout line pointer LP8 is stored into the memory 504, and so on, prior to inspection. A line counter 530 counts up the lines from the starting point of a chip. When inspection begins, each time a matching occurs between the value of the line counter 530 and the value of a cutout line pointer in each memory, a relevant starting signal is asserted.

Operation is explained, considering the processor element PE (0). The values of the cutout line pointers LP1, LP5, etc. are stored beforehand in the memory 501 and cutout width W is stored beforehand in the cutout width setting memory 509. When inspection begins, the line counter 530 counts the lines. When a matching occurs between the value of the line counter 530 and the value of the cutout line pointer LP1, the cutout starting signal 510 is asserted. The cutout circuit 520 cuts the serial image data input through the path 109 into image data each having the cutout width W set in the cutout width setting memory 509 and starting from the timing when the cutout starting signal 510 has just been asserted, and outputs the cutout image data to the processor element PE (0). Subsequently, when a matching occurs between the value of the line counter 530 and the value of the cutout line pointer LP5, the cutout starting signal 510 is asserted again. The cutout circuit 520 cuts out the image data having the cutout width W set in the cutout width setting memory 509 and starting from the timing of the assertion of cutout starting signal, and outputs the cutout image data to the processor element PE (0).

This operation is distribution of unit image data D1 and D5 to the processor element PE (0) illustrated in FIG. 4. When inspection of the next chip begins, the line counter 530 is cleared to zero and starts to count up the lines. The image data in corresponding locations can be distributed to the same processor.

One embodiment of the method for cutting out image data of the present invention has been discussed hereinbefore, referring to FIGS. 1 to 5. The defect inspection in the present image processing apparatus, by using die to die comparison inspection, cell to cell comparison inspection, and cell-to-cell and die-to-die hybrid comparison inspection will be discussed hereinafter.

Figure 6:
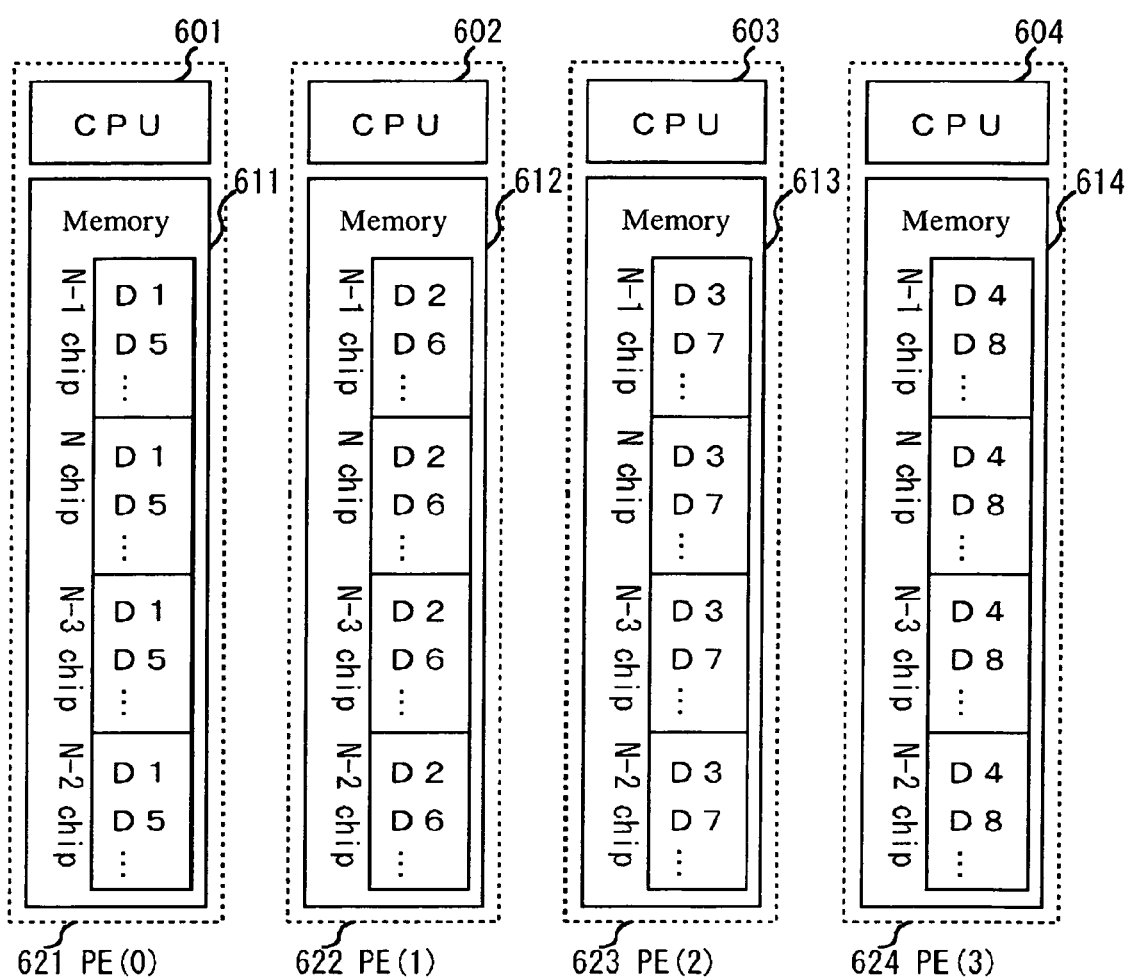
FIG. 6 is a diagram showing configurations of processor elements.

Referring to FIGS. 6 through 9, defect inspection based on die to die comparison is discussed. FIG. 6 is a diagram showing the configurations of the four processor elements PE (0) 621, PE (1) 622, PE (2) 623, and PE (3) 624. The processor element PE (0) 621 comprises a CPU 601 and a memory 611. The processor element PE (1) 622 comprises a CPU 602 and a memory 612. The processor element PE (2) 623 comprises a CPU 603 and a memory 613. The processor element PE (3) 624 comprises a CPU 604 and a memory 614. The portions of each memory are allocated for individual areas to store cutout image data.

Figure 7:
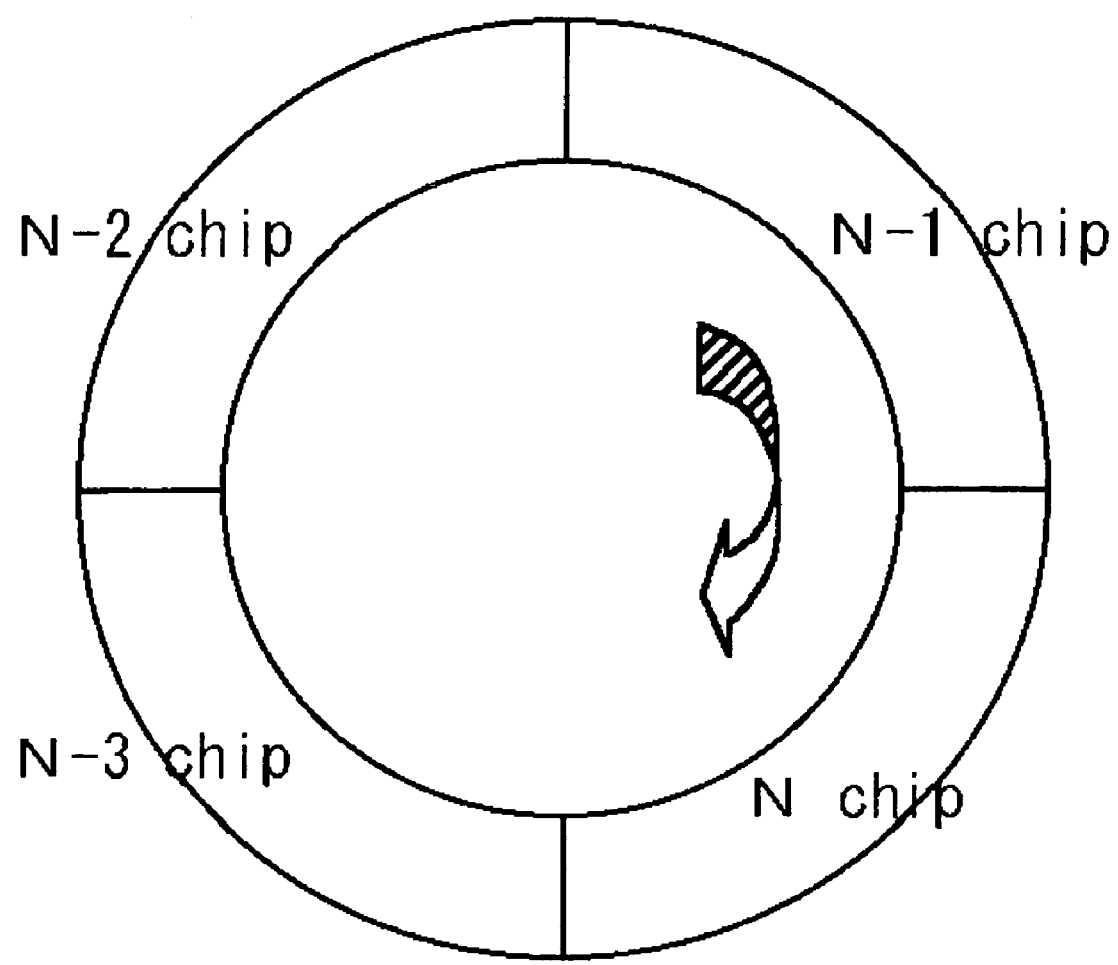
FIG. 7 is a diagram showing a configuration of memory in a processor element.

FIG. 7 is a diagram showing a memory configuration in each processor element shown in FIG. 6. In the present embodiment, the image memory configuration is a ring buffer type with four banks. The memory is controlled such that, if, for example, chip n is now undergoing inspection, its image data and image data for the preceding three chips n−1, n−2, n−3 are stored in the banks. Returning to FIG. 6, the four banks of each memory contain unit image data allocated to the processor elements. For example, unit image data D1 is allocated to the processor element PE (0), unit image data D2 is allocated to the processor element PE (1), unit image data D1 is allocated to the processor element PE (2), unit image data D4 is allocated to the processor element PE (3), unit image data D5 is allocated to the processor element PE (0), unit image data D6 is allocated to the processor element PE (1), unit image data D7 is allocated to the processor element PE (2), unit image data D8 is allocated to the processor element PE (3), and so on.

Figure 8:
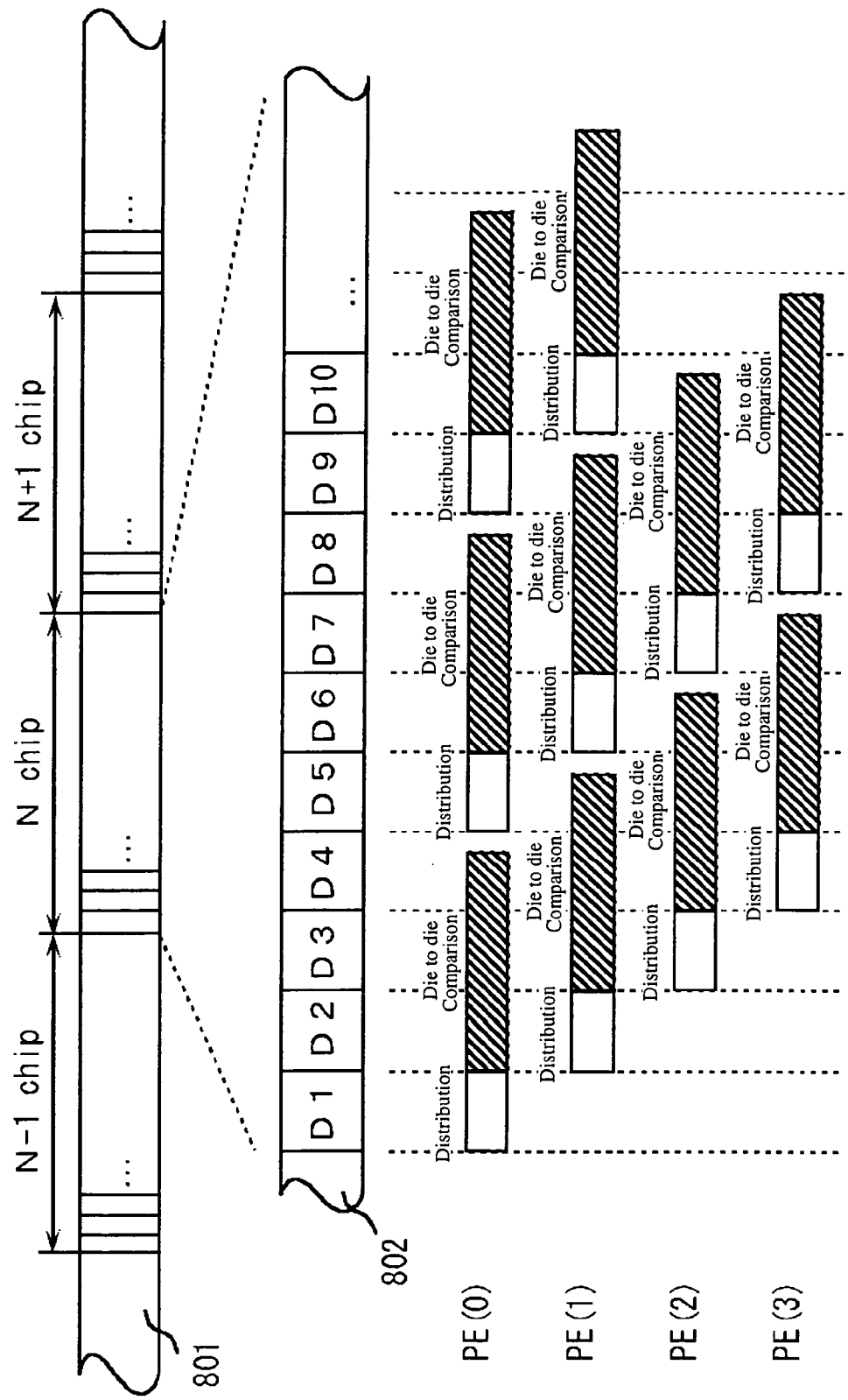
FIG. 8 is a diagram of another operation sequence of the processors.

FIG. 8 is a diagram of another operation sequence of the processors. Reference numeral 801 denotes serial image data including chips n−1, n, and n+1. Reference numeral 802 denotes an enlarged view of image data of chip n including unit image data D1, D2, D1, etc. When a cutout image data comprising unit image data D1 is distributed to the processor element PE (0), the PE (0) immediately starts computing for die to die comparison. When a cutout image data comprising unit image data D2 is distributed to the processor element PE (1), the PE (1) immediately starts computing for die to die comparison. Similarly, the remaining processor elements operate in this way. Considering the processor element PE (0), the PE (0) is to complete the computing for die to die comparison inspection before the incoming of a subsequent cutout image data comprising unit image data D5 . There is a relationship between the number of processor elements and time to spare to perform this computing. As the number of processor elements increases, more time can be spared to perform the computing for die to die comparison inspection.

Figure 9:
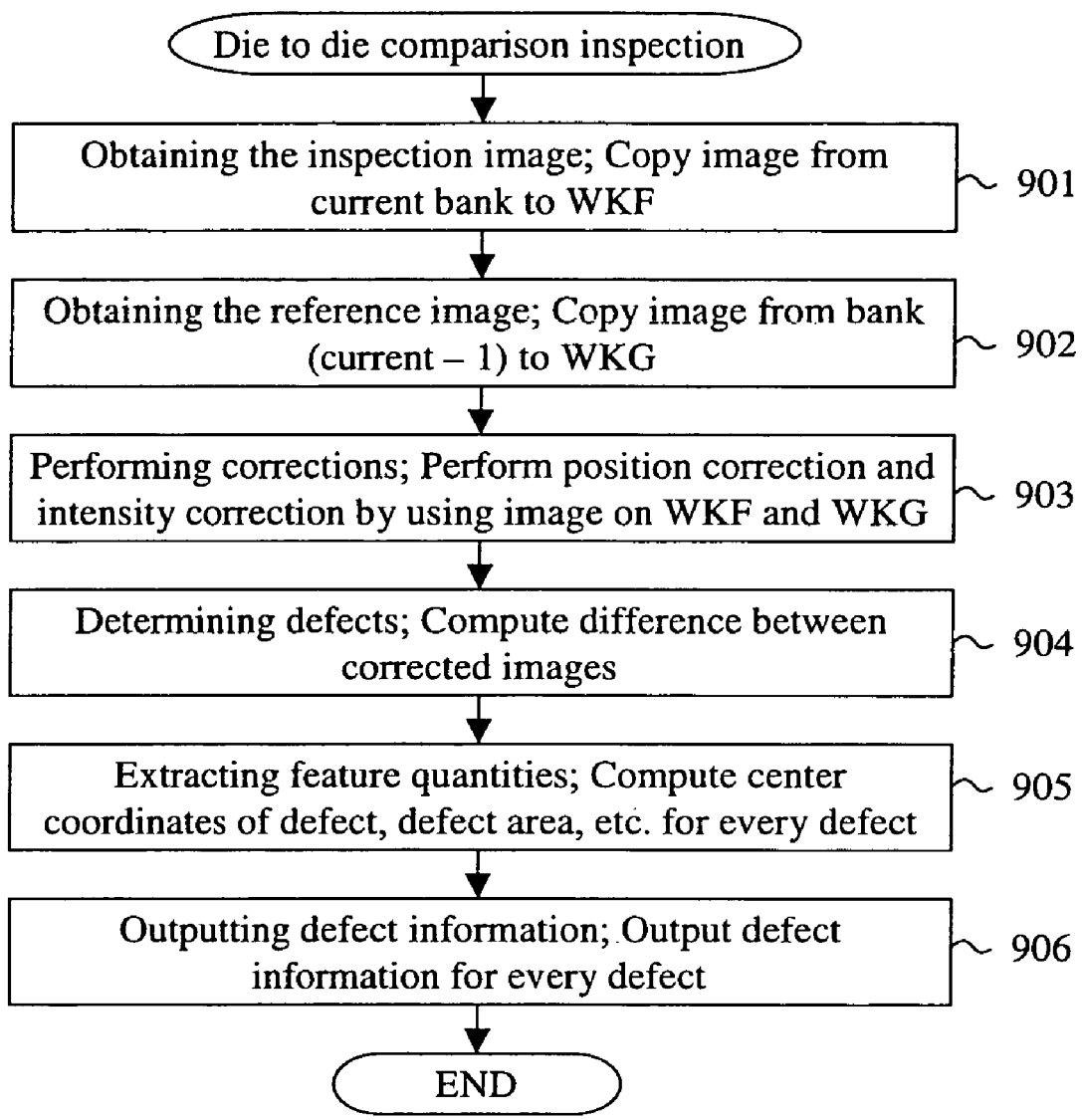
FIG. 9 is a flowchart showing an operation performed by a processor in die to die comparison inspection.

FIG. 9 is a flowchart showing an operation performed by each processor for die to die comparison inspection. This processing comprises a step 901 of obtaining an inspection image, a step 902 of obtaining a reference image, a step 903 of performing corrections, a step 904 of determining defects, a step 905 of extracting feature quantities, and a step 906 of outputting defect information. The same program implementing this processing is stored on all the processor elements and the program on each PE starts when the distribution of cutout image data is completed. As shown in FIG. 8, the distribution timing is delayed among the processor elements and the program operation by the CPU on each PE is delayed accordingly. A concrete example of program operation for unit image data D5 of chip n is discussed below. The image data of unit image data D5 is stored in place on the memory of the processor element PE (0). When the distribution of cutout image data including unit image data D5 is completed, the program operation on the CPU of the PE (0) starts.

First, in step 901, the processor copies the unit image data D5 of chip n on a working area WKF, thus obtaining the inspection image. Then, in step 902, the processor copies the unit image data D5 of chip n−1 on a working area WKG, thus obtaining the reference image. Next, in step 903, the processor performs corrections such as position correction and intensity correction by using the unit image data D5 of chip n stored in the area WKF and the unit image data D5 of chip n−1 in the area WKG. Next, in step 904, the processor computes difference between the two corrected image data to identify defects. Next, in step 905, the processor performs computing the feature quantities such as center coordinates of defect, defect area, etc. for every defect. Finally, in step 906, the processor outputs defect information including the defect feature quantities obtained for every defect with the ID identifying the unit image data D5 of chip n. Then, the processor becomes an idle state. When a subsequent distribution of cutout image including unit image data D9 is completed, the program restarts.

Figure 10:
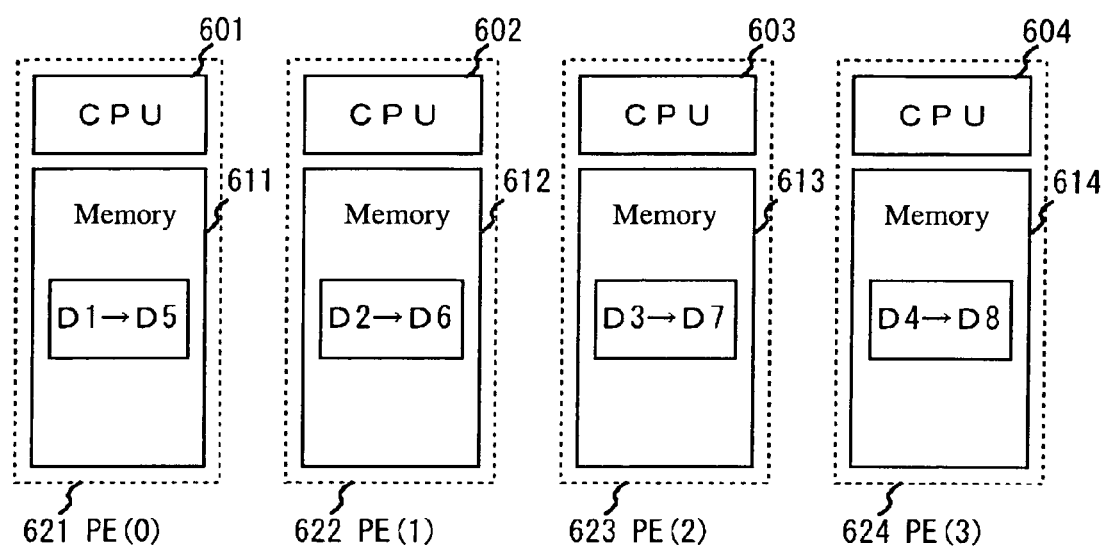
FIG. 10 is a diagram showing configurations of the processor elements.
Figure 11:
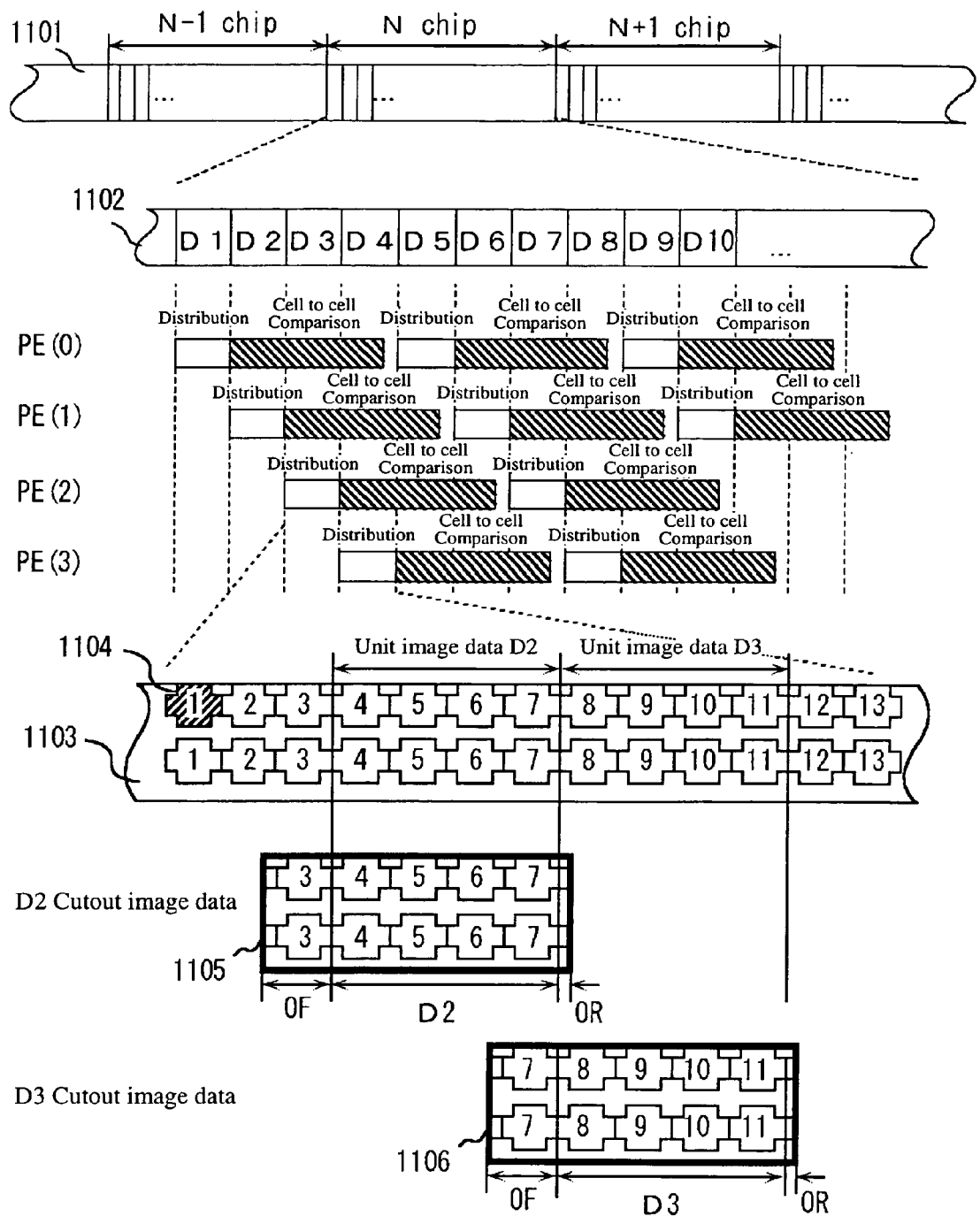
FIG. 11 is a diagram of another operation sequence of the processors.
Figure 12:
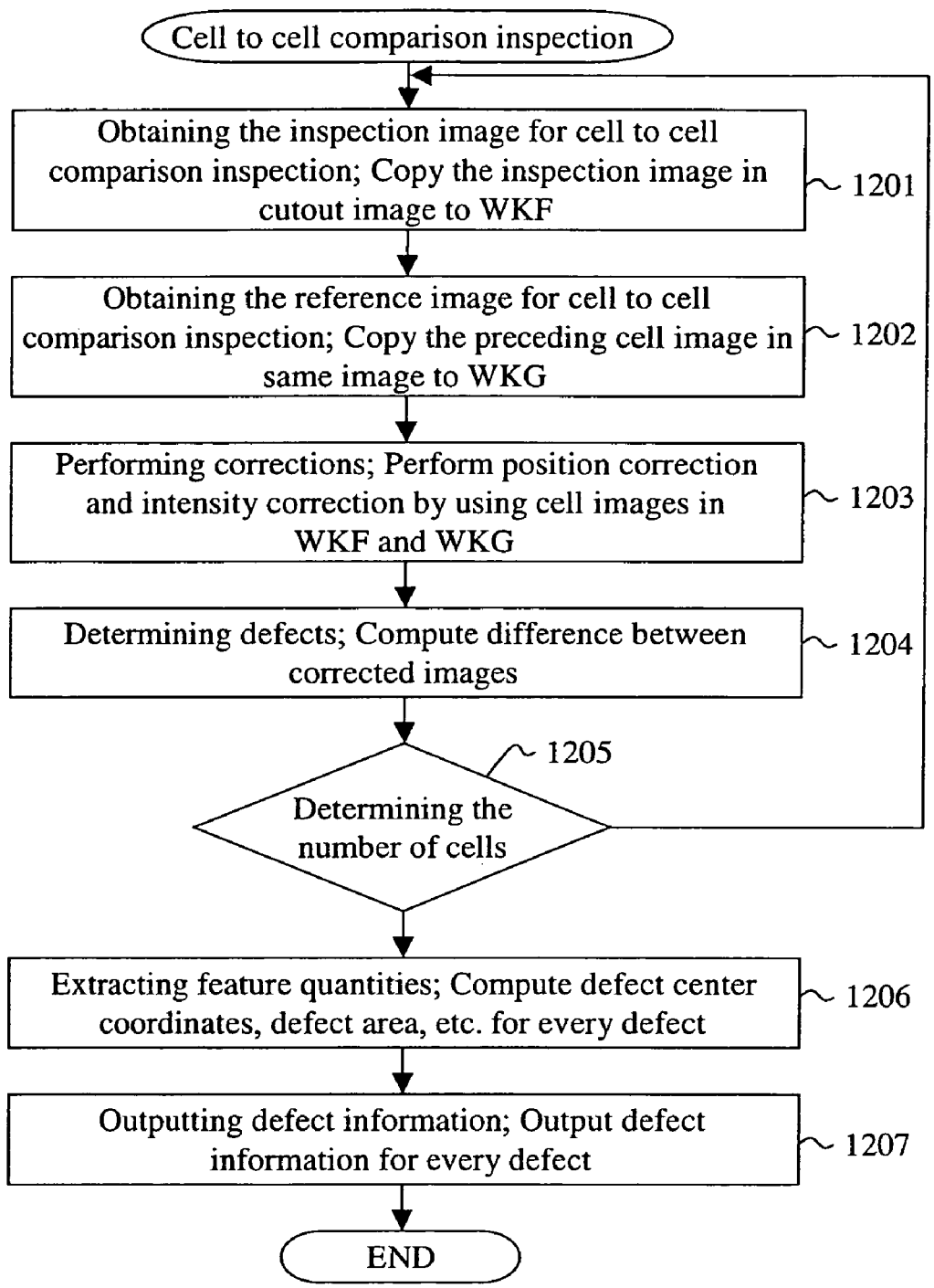
FIG. 12 is a flowchart showing an operation performed by a processor in cell to cell comparison inspection.

Referring to FIGS. 10 through 12, defect inspection based on cell to cell comparison is discussed. FIG. 10 is a diagram showing another configuration including four processor elements PE (0) 621, PE (1) 622, PE (20) 623, and PE (3) 624. The processor element PE (0) 621 comprises the CPU 601 and the memory 611. The processor element PE (1) 622 comprises the CPU 602 and the memory 612. The processor element PE (2) 623 comprises the CPU 603 and the memory 613. The processor element PE (3) 624 comprises the CPU 604 and the memory 614. A portion of each memory is an image data area to store cutout image data. For example, unit image data D1 is stored on the processor element PE (0), unit image data D2 is stored on the processor element PE (1), unit image data D1 is stored on the processor element PE (2), unit image data D4 is stored on the processor element PE (3), unit image data D5 is stored on the processor element PE (0), unit image data D6 is stored on the processor element PE (1), unit image data D7 is stored on the processor element PE (2), unit image data D8 is stored on the processor element PE (3), and so on.

Because cell to cell comparison inspection is performed in individual unit image data Dn, as will be described later, it is necessary to store only the current target unit image data. For example, after the processor element PE (0) completes the processing of unit image data D1, and a subsequent distribution of unit image data D5 is completed, the unit image data D1 may be overwritten by the unit image data D5.

FIG. 11 is a diagram of another operation sequence of the processors. Referring to FIG. 11, the operation of cell to cell comparison inspection is discussed. Reference numeral 1101 denotes serial image data including chips n−1, n, and n+1. Reference numeral 1102 denotes an enlarged view of image data of chip n including unit image data D1, D2, D3, etc. When a cutout image data comprising unit image data D1 is distributed to the processor element PE (0), the PE (0) immediately starts computing for cell to cell comparison. When a cutout image data comprising unit image data D2 is distributed to the processor element PE (1), the PE (1) immediately starts computing for cell to cell comparison. Similarly, the remaining processor elements operate in this way.

Reference numeral 1103 denotes an enlarged view of the image data including unit image data D2 and D3. It is assumed that a cell refers to a region having an identical repeated pattern like the cell of memory mats and a cell region refers to the region of a cell 1104 in FIG. 11. Reference numeral 1105 denotes a cutout image data comprising a forward end overlap OF, a rear end overlap OR, and unit image data D2. Reference numeral 1106 denotes a cutout image data comprising a forward end overlap OF, rear end overlap OR, and unit image data D3.

Considering the processor element PE (0), the PE (0) completes the computing for cell to cell comparison inspection before the incoming of a subsequent cutout image data comprising unit image data D5. There is a relationship between the number of processor elements and time to spare to perform this computing. As the number of processor elements increases, more time can be spared to perform the computing for cell to cell comparison.

FIG. 12 is a flowchart of processing that is performed by each processor for cell to cell comparison inspection. This processing comprises a step 1201 of obtaining an inspection image for cell to cell comparison inspection, a step 1202 of obtaining a reference image for cell to cell comparison inspection, a step 1203 of performing corrections, a step 1204 of determining defects, a step 1205 of determining the number of cells, a step 1206 of extracting feature quantities, and a step 1207 of outputting defect information. The same program implementing this processing is stored on all the processor elements and the program on each PE starts when the distribution of cutout image data is completed. As shown in FIG. 11, the distribution timing is delayed among the processor elements and the program operation by the CPU on each PE is delayed accordingly.

A concrete example of program operation for unit image data D2 of chip n is discussed below, referring to FIGS. 11 and 12. Unit image data D2 is stored in the memory of the processor element PE (1). When the distribution of a cutout data including unit image data D5 is completed, the program operation on the CPU of the PE (1) starts.

First, in step 1201, the processor copies the image data of a cell 4 in the unit image data D2 on the working area WKF, thus obtaining the inspection image. Then, in step 1202, the processor copies the image data of a cell 3 in unit image data D2 on the working area WKG to obtain the reference image. Next, in step 1203, the processor performs corrections such as position correction and intensity correction by using the image data of cell 4 in the unit image data D2 stored in the working area WKF and the image data of cell 3 in the unit image data D2 in the working area WKG. Next, in step 1204, the processor computes difference between the two corrected images to identify defects. Next, in step 1205, the processor determines the number of cells. In this example, because the inspection image contains four cells from cell 4 to cell 7, the loop from step 1201 to step 1204 are repeated for four times. What are loaded into the working areas WKF and WKG for every loop are as follows. In the first loop, the image data of cell 4 in the unit image data D2 is loaded into the working area WKF and the image data of cell 3 in the unit image data D2 is loaded into the working area WKG. In a second loop, the image data of cell 5 in the unit image data D2 is loaded into the working area WKF and the image data of cell 4 in the unit image data D2 is loaded into the working area WKG. In a third loop, the image data of cell 6 in the unit image data D2 is loaded into the working area WKF and the image data of cell 5 in the unit image data D2 is loaded into the working area WKG. In a fourth loop, the image data of cell 7 in the unit image data D2 is loaded into the working area WKF and the image data of cell 6 in the unit image data D2 is loaded into the working area WKG.

When loops are completed for the necessary cells, in step 1206, the processor performs computing to extract the feature quantities of defects such as center coordinates of defect, defect area, etc. for every defect. Finally, in step 1207, the processor outputs defect information including the defect feature quantities obtained for every defect with the ID identifying the unit image data D2 of chip n. Then, the processor becomes the idle state. When a subsequent distribution of cutout image including unit image data D6 is completed, the program restarts to perform the same operations as described above.

If the forward end overlap OF is less than a cell pitch size, and the cell 4 is inspected, the preceding image data of cell 3 does not exist on the processor element PE (1). Accordingly, a problem arises that it is impossible to perform continuous inspection due to the area to prevent inspection. This problem can be eliminated by "processor to processor communication" through which the PE (1) obtains the image data of cell 3 that exists on the memory of the processor element PE (0). However, a new configuration for performing "processor to processor communication" is needed and this is disadvantageous in terms of simplifying the structure of the image processing apparatus.

In the present invention, the forward end overlap OF includes a cell pitch size and, therefore, the processor element PE (1) can perform cell to cell comparison inspection for all the cells including the cell 4, that is, the cells 4 to 7 from the cutout image data. Similarly, the following processor element PE (2) can perform the inspection for cells 8 to 11. Consequently, such an advantageous effect can be achieved that the serial image data 1103 can be inspected continuously, since discontinuation due to distribution of image data does not occur.

Figure 13:
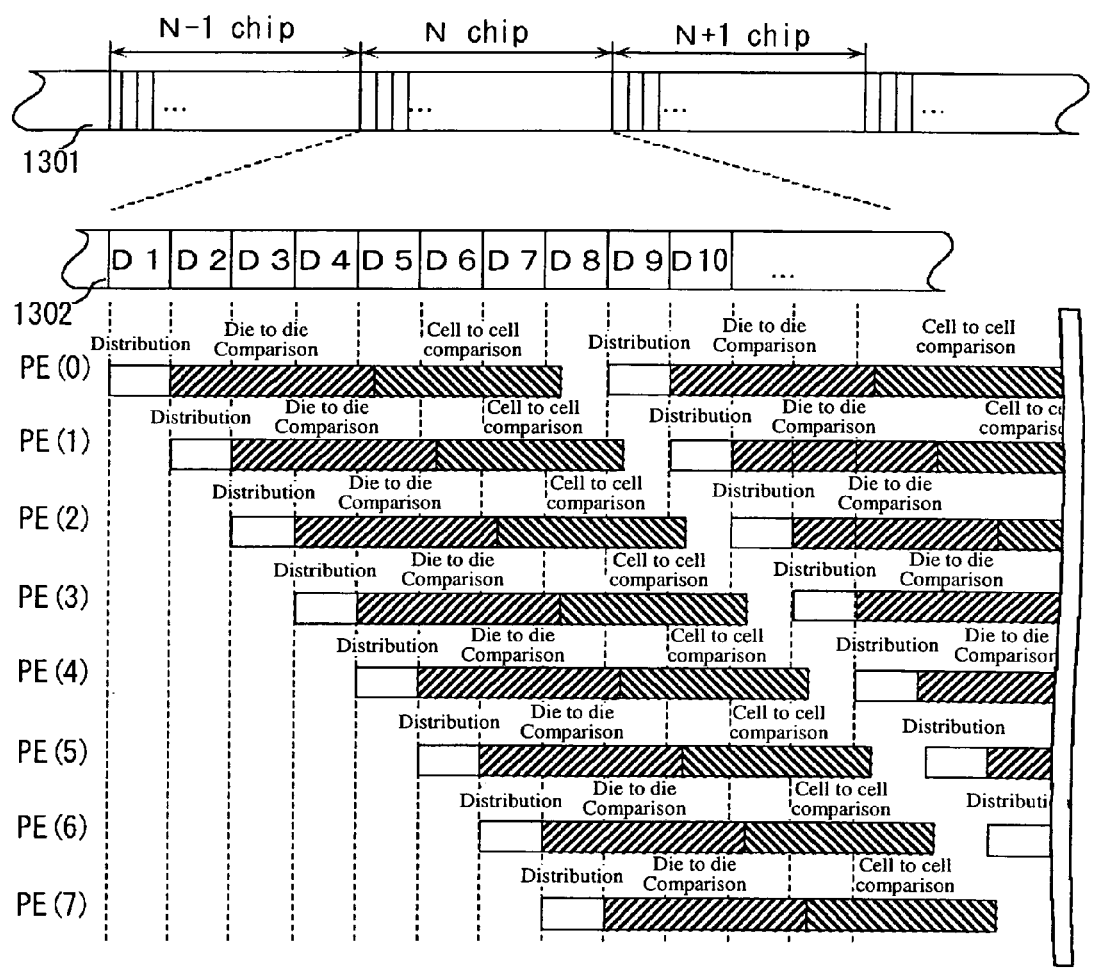
FIG. 13 is a diagram of another operation sequence of the processors.
Figure 14:
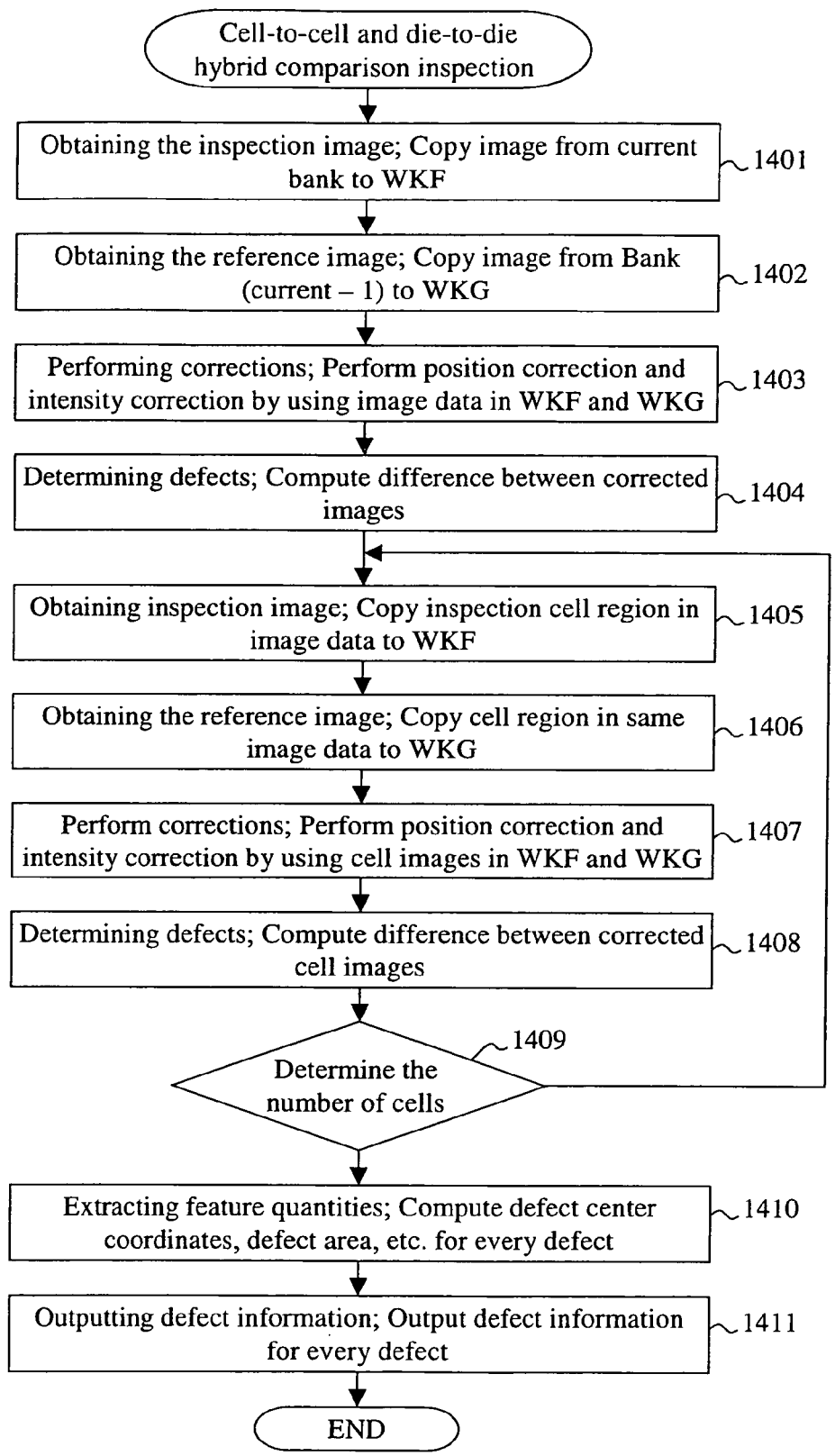
FIG. 14 is a flowchart showing an operation performed by a processor in cell-to-cell and die-to-die hybrid comparison inspection.

Next, defect inspection based on cell-to-cell and die-to-die hybrid comparison inspection is discussed, referring to FIGS. 13 and 14. FIG. 13 is a diagram of another operation sequence of the processors and FIG. 14 is a flowchart of processing that is performed by each processor for cell-to-cell and die-to-die hybrid comparison inspection. Because the processing load to be allocated to each processor increases in cell to cell and die to die hybrid comparison inspection, the image processing unit is configured with eight processor elements. The memory configuration in each processor element is a ring buffer type with four banks as set forth in FIGS. 6 and 7. The four banks of each memory contain unit image data allocated to the processor element. For example, unit image data D1 is allocated to the processor element PE (0), unit image data D2 is allocated to the processor element PE (1), unit image data D1 is allocated to the processor element PE (2), unit image data D4 is allocated to the processor element PE (3), unit image data D5 is allocated to the processor element PE (4), unit image data D6 is allocated to the processor element PE (5), unit image data D7 is allocated to the processor element PE (6), unit image data D8 is allocated to the processor element PE (7), unit image data D9 is allocated to the processor element PE (0), and so on.

Then, operation is explained, referring to FIG. 13. Reference numeral 1301 denotes serial image data including chips n−1, n, and n+1. Reference numeral 1302 denotes an enlarged view of image data of chip n including unit image data D1, D2, D3, etc. When a cutout image data comprising unit image data D1 is distributed to the processor element PE (0), the PE (0) immediately starts computing for cell-to-cell and die-to-die hybrid comparison inspection. When a cutout image data comprising unit image data D2 is distributed to the processor element PE (1), the PE (1) immediately starts computing for cell-to-cell and die-to-die hybrid comparison. Similarly, the remaining processor elements operate in this way. Considering the processor element PE (0), the PE (0) is to complete the computing for cell to cell and die to die hybrid comparison inspection before the incoming of a subsequent cutout image data comprising unit image data D9.

There is a relationship between the number of processor elements and time to spare to perform this computing. As the number of processor elements increases, more time can be spared to perform the computing for cell-to-cell and die-to-die hybrid comparison. Supposing that cell-to-cell and die-to-die hybrid comparison inspection be applied to a wafer, some area on the wafer would be effective for die to die comparison, other area would be effective for cell to cell comparison. The image processing apparatus would perform computing and outputting the defect data in effective inspection area for die to die comparison inspection or in effective inspection area for cell to cell comparison inspection. In a local aspect, individual basic image data is inspected by either cell to cell comparison or die to die comparison. However, in the present embodiment, the number of processor elements is determined in order to ensure the maximum operation time of a cell-to-cell and die-to-die hybrid comparison program.

Processing set forth in FIG. 14 comprises a step 1401 of obtaining an inspection image for a die to die comparison inspection, a step 1402 of obtaining a reference image for a die to die comparison inspection, a step 1403 of performing corrections for a die to die comparison inspection, a step 1404 of determining defects on the die, a step 1405 of obtaining an inspection image for a cell to cell comparison inspection, a step 1406 of obtaining a reference image for a cell to cell comparison inspection, a step 1407 of performing corrections for a cell to cell comparison inspection, a step 1408 of determining defects on the cell, a step 1409 of determining the number of cells, a step 1410 of extracting feature quantities, and a step 1411 of outputting defect information. The same program implementing this processing is stored on all the processor elements and the program on each PE starts when the distribution of cutout image data is completed. As shown in FIG. 13, the distribution timing is delayed among the processor elements and the program operation by the CPU on each PE is delayed accordingly.

A concrete example of program operation for unit image data D2 of chip n is discussed below, referring to FIGS. 13, 14, and 11. The image data of unit image data D2 is stored in place on the memory of the processor element PE (1). When the distribution of a cutout image data including unit image data D2 is completed, the program operation on the CPU of the PE (1) starts. First, in step 1401, the processor copies the unit image data D2 of chip n on a working area WKF, thus obtaining the inspection image for die to die comparison. Then, in step 1402, the processor copies the unit image data D2 of chip n−1 on a working area WKG, thus obtaining the reference image for die to die comparison. Next, in step 1403, the processor performs corrections such as position correction and intensity correction by using the unit image data D2 of chip n stored in the working area WKF and the unit image data D2 of chip n−1 in the working area WKG.

Next, in step 1404, the processor computes difference between the two corrected image data to identify defects. Then, in step 1405, the processor copies the image data of a cell 4 in the unit image data D2 on the working area WKF, thus obtaining the inspection image for cell to cell comparison. In step 1406, the processor copies the image data of a cell 3 in the unit image data D2 on the working area WKG, thus obtaining the reference image for cell to cell comparison. Next, in step 1407, the processor performs corrections such as position correction and intensity correction by using the image data of cell 4 in the unit image data D2 stored in the working area WKF and the image data of cell 3 in the unit image data D2 in the working area WKG.

Next, in step 1408, the processor computes difference between the two corrected images to identify defects. Next, in step 1409, the processor determines the number of cells. In this example, because the cutout image data contains four cells from cell 4 to cell 7, the loop including from step 1405 to step 1408 are repeated for four times. What are loaded into the working areas WKF and WKG for every loop is as follows. In the first loop, the image data of cell 4 in the unit image data D2 is loaded into the working area WKF and the image data of cell 3 in the unit image data D2 is loaded into the working area WKG. In a second loop, the image data of cell 5 in the unit image data D2 is loaded into the working area WKF and the image data of cell 4 in the unit image data D2 is loaded into the working area WKG. In a third loop, the image data of cell 6 in the unit image data D2 is loaded into the working area WKF and the image data of cell 5 in the unit image data D2 is loaded into the working area WKG. In a fourth loop, image data of cell 7 in the unit image data D2 is loaded into the working area WKF and the image data of cell 6 in the unit image data D2 is loaded into the working area WKG. When loops are completed for the necessary cells, in step 1410, the processor performs computing to extract the feature quantities of defects such as center coordinates of defect, defect area, etc. for every defect.

Finally, in step 1411, the processor outputs defect information including the defect feature quantities obtained for every defect with the ID identifying the unit image data D2 of chip n. Then, the processor becomes the idle state. When a subsequent distribution of cutout image data including unit image data D6 is completed, the program restarts to perform the same operations as described above.

As discussed above, according to this embodiment of the present invention, the CPU on each processor element can independently performs die to die comparison inspection, cell to cell comparison inspection, or cell-to-cell and die-to-die hybrid comparison inspection, for the cutout image data distributed to each processor element thereby eventually obtaining defect information. For example, if an image processing unit is configured with a plurality of functionally distributed processors which exchange image data being processed and reference data with each other, problems such as synchronization among the processors and data coherency may be solved. According to the present embodiment set forth above, advantageous effects can be obtained that the image processing units are free from these problems and are able to perform higher speed processing and real-time control.

Because data is cut out into equal length parts and the whole cutout image is inspected by die to die comparison in order to detect defects, the amount of processing data and processing operation is constant and therefore almost the same processing time can be achieved. From another perspective, it is unnecessary to dynamically control partitioning and distributing data to a plurality of processors, while monitoring the processing states of the processors. Because data is cut out into partitions equally which are distributed sequentially to the processors, a still further advantage lies in reduced overhead in processor control and capability of real time control.

Figure 15:
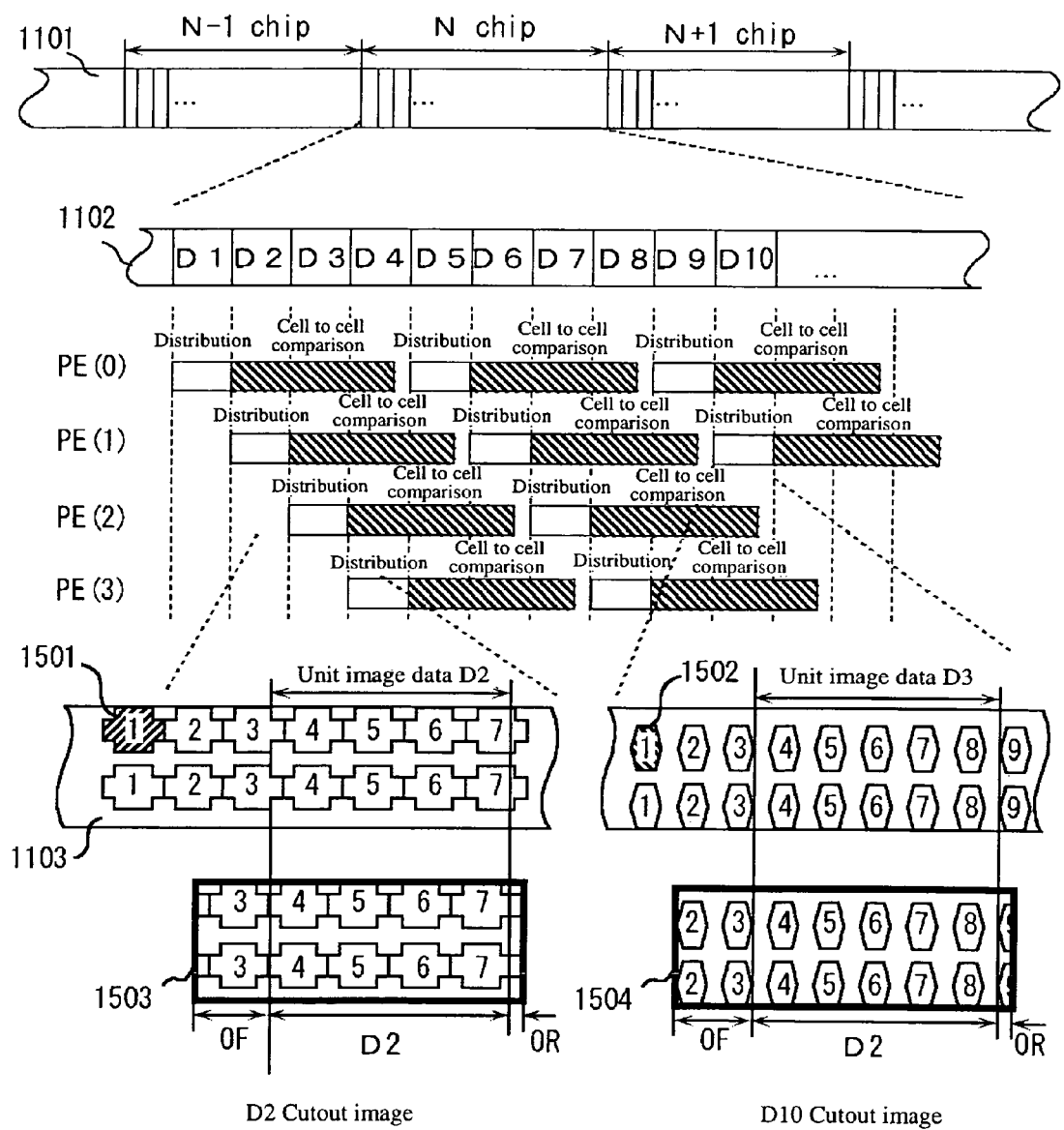

FIG. 15 is a diagram of another operation sequence of the processors, which shows an embodiment alternative to the embodiment set forth in FIG. 11. The difference between the two embodiments is in a cutting out method if different cell pitch sizes exist. In unit image data D2, a cell pitch of cell 1501 exists. In unit image data D10, a cell pitch of cell 1502 exists. In this case, the length of the forward end overlap OF of a cutout image is determined by the maximum cell pitch in a chip. In this case, both unit image data D2 and D10 have equal forward end overlaps OF and rear end overlaps OR, as shown in the views of cutout image data 1503 and 1504. Consequently, the forward end overlap OF of the unit image data D10 in the cutout image data 1504 contains cells 2 and 3. When cell to cell comparison inspection is performed for cells 4 to 8, the cell 2 is not necessary.

In this embodiment, the maximum cell pitch size throughout the chip is obtained before inspection. During inspection, by cutting out all the image data with the overlap OF, high operation can be performed.

Figure 16:
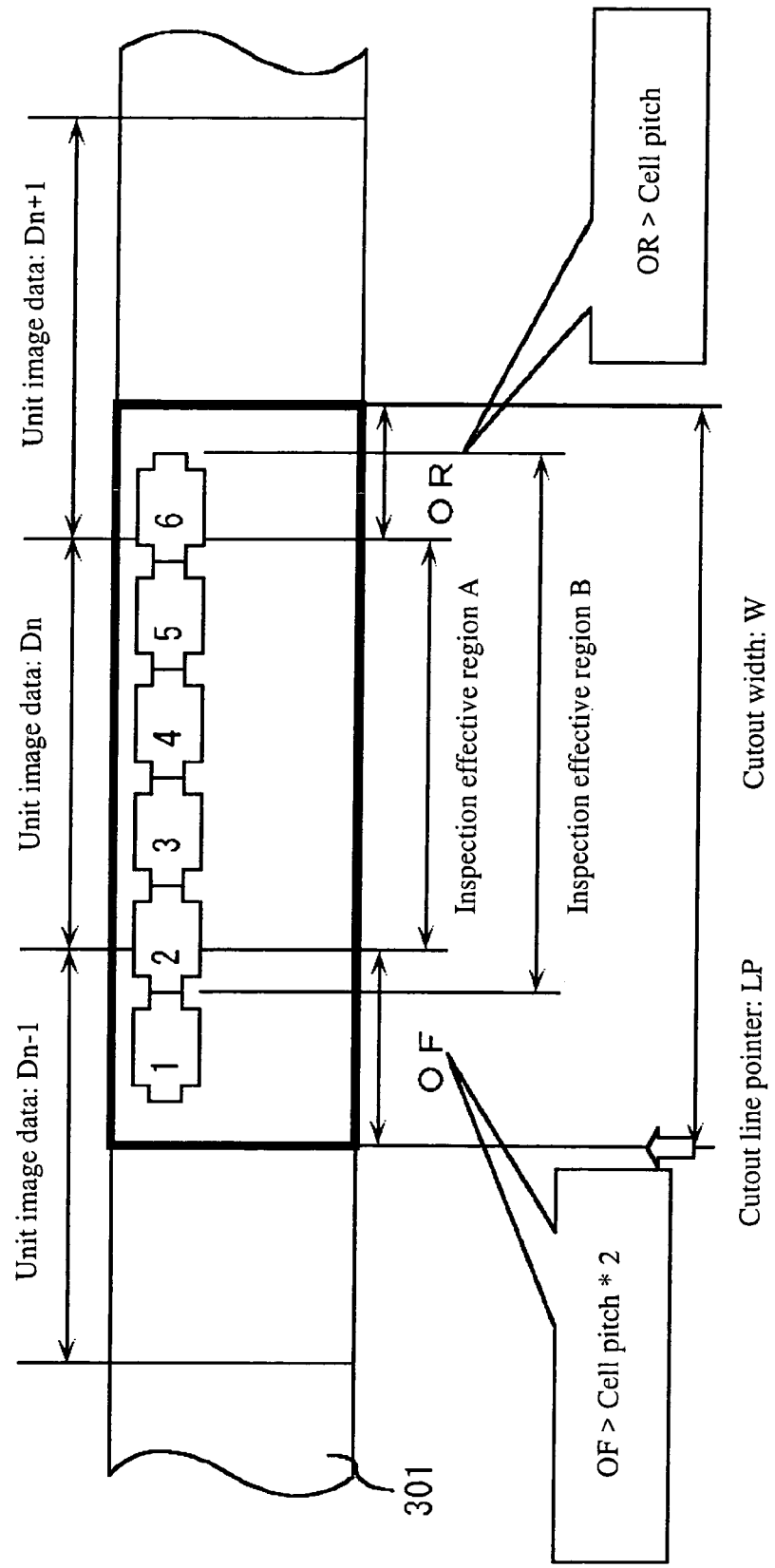
FIG. 16 is a diagram explaining another method for cutting serial image data into a plurality of unit image data.
Figure 17:
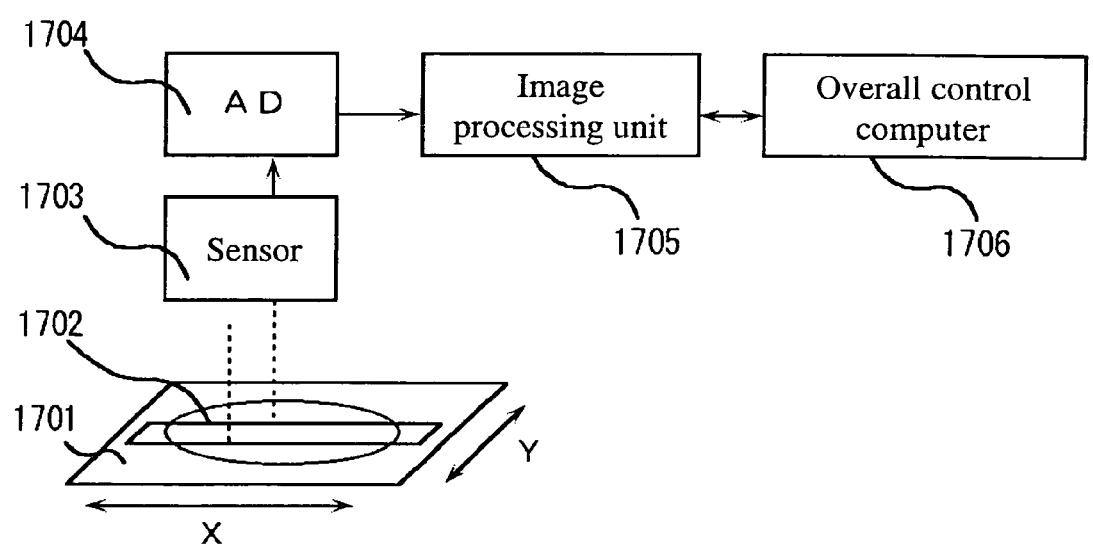
FIG. 17 is a functional block diagram showing a typical structure of visual inspection apparatus including an image processing unit.
Figure 18:
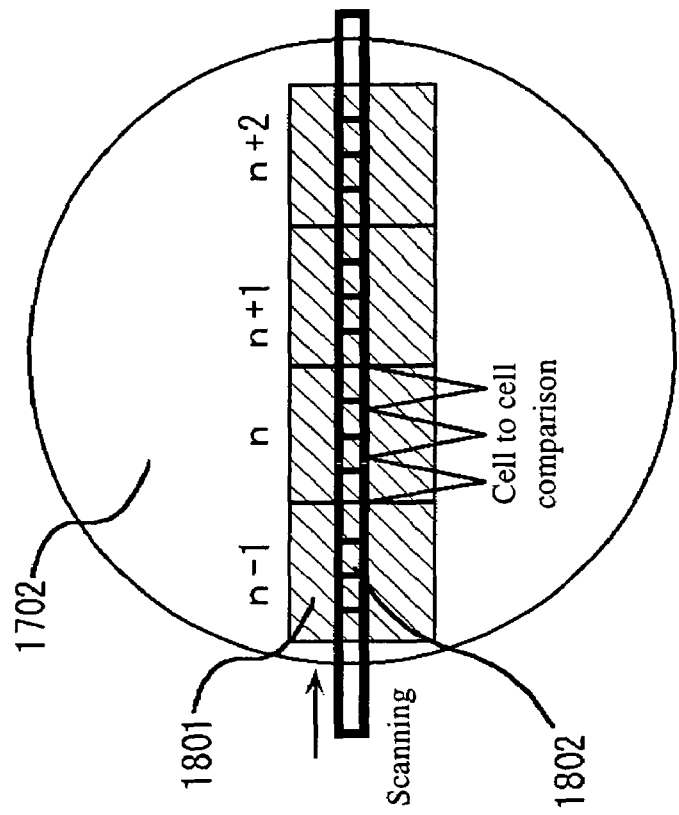
FIG. 18A is a semiconductor wafer top view for explaining die to die comparison inspection.
FIG. 18B is a semiconductor wafer top view for explaining cell to cell comparison inspection.
Figure 18:
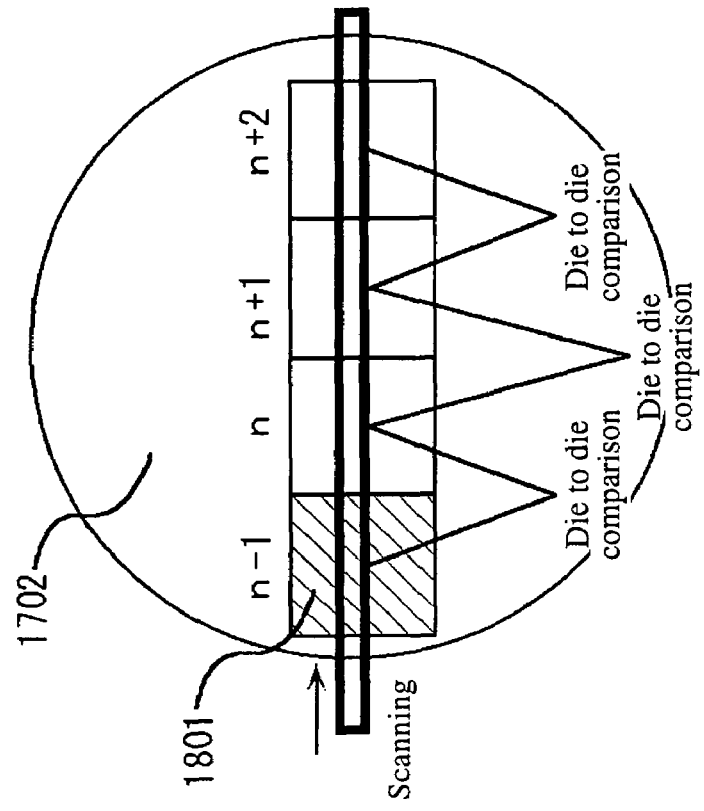
Figure 19:
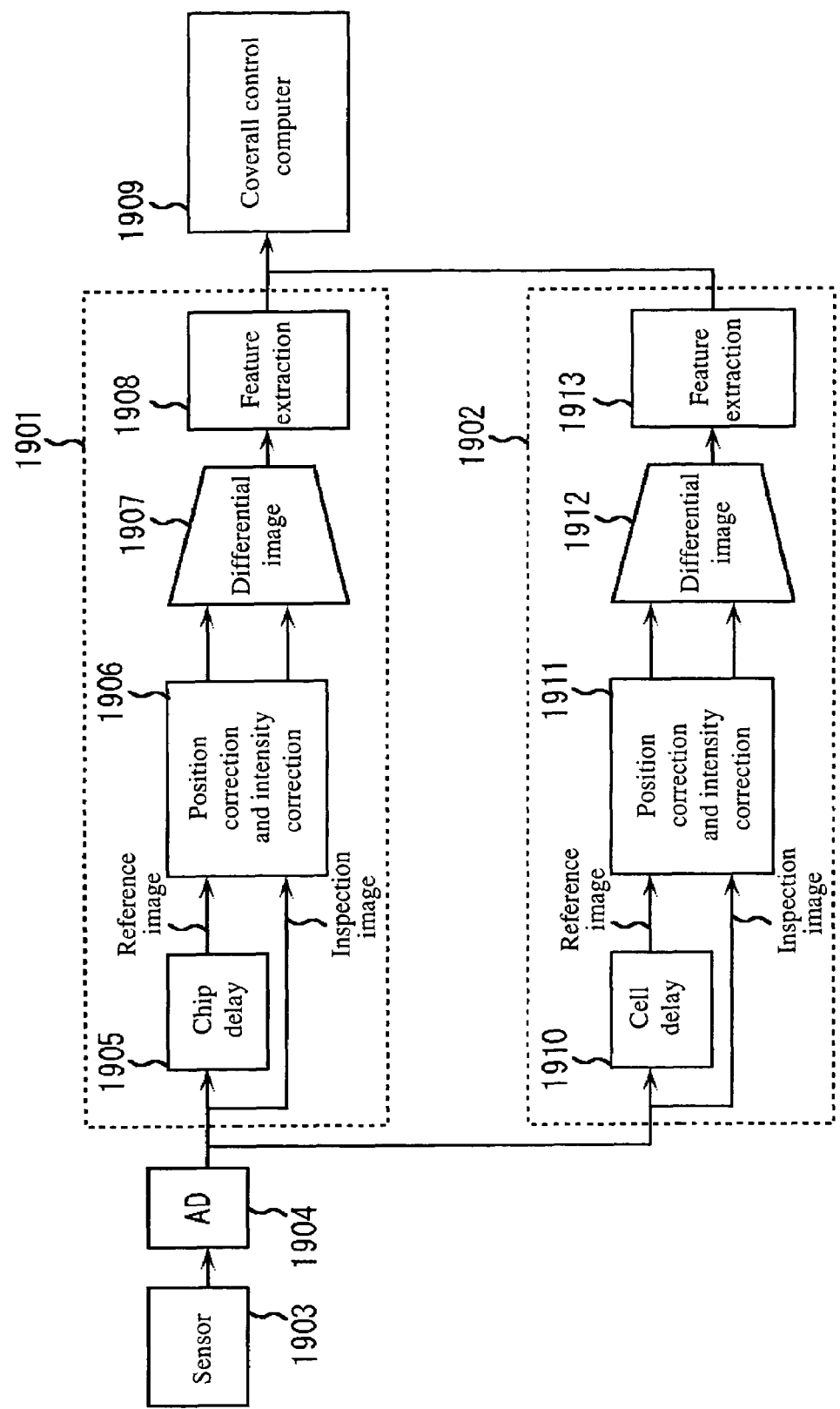
FIG. 19 is a functional block diagram showing a configuration of image processing unit according to a prior art.
Figure 20:
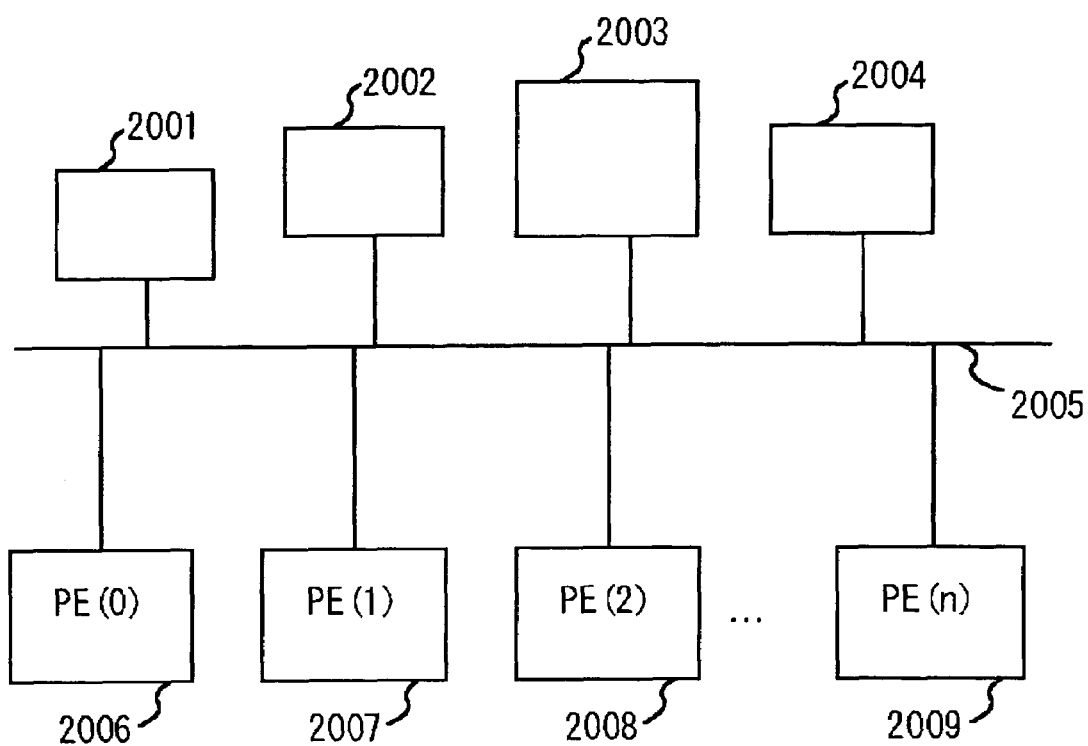
FIG. 20 is a schematic diagram showing a conventional image processing apparatus configuration.
Figure 21:
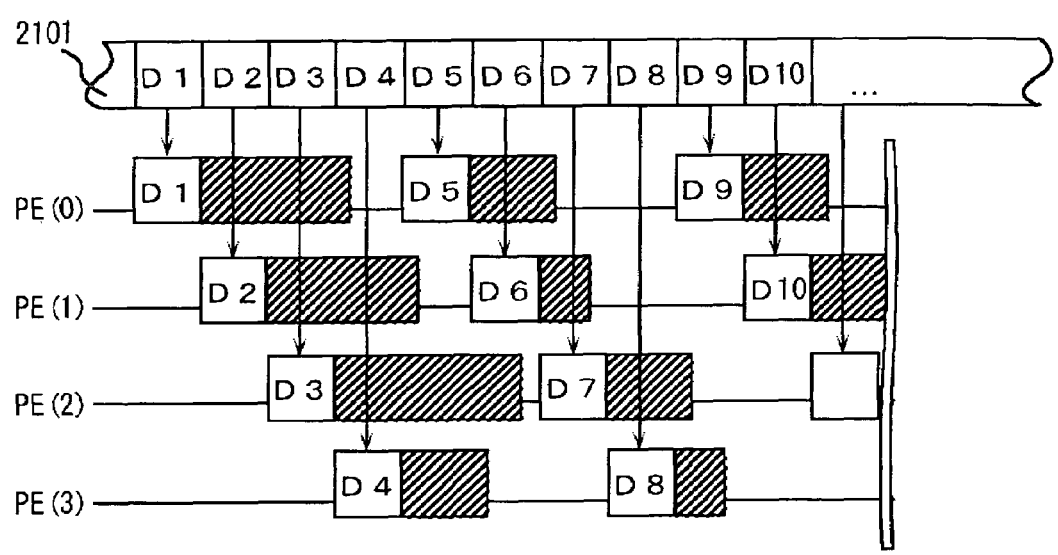
FIG. 21 is a diagram of an operation sequence of conventional processors.

FIG. 16 is a diagram explaining a method for cutting serial image data according to another embodiment. The difference from the embodiment set forth in FIG. 3 is in that an inspection effective region is set wider than an image partition for inspection. In FIG. 16, reference numeral 301 denotes serial image data with a 256 pixel width and an enlarged view of unit image data Dn−1, Dn, and Dn+1 lines is shown wherein the unit image data is assumed to be 256 pixel width×1024. When cutting out a unit image data Dn, overlap margins for operation processing must be added, as described hereinbefore. Overlap margins in the channel direction are as set forth in FIG. 2, and are not discussed here. Overlaps in the partitioning direction are discussed below. If an overlap of the Dn with the preceding unit image data Dn−1 is defined as a forward end overlap OF and an overlap of the Dn with the following unit image data Dn+1 is defined as a rear end overlap OR, the size of a cutout image data including the unit image data Dn is 256 pixel width×(forward end overlap OF+unit image data Dn+rear end overlap OR). The forward end overlap OF is the sum of an overlap margin for operation processing and the double of a cell pitch size and the rear end overlap OR is the sum of an overlap margin for operation processing and the cell pitch size.

Examples of concrete values of these overlaps are given below. Supposing that unit image data size is 1024 pixels, overlap margin for operation processing is 32 pixels, and the cell pitch size for cell to cell comparison inspection is 256 pixels, the forward end overlap OF is 32+2×256, hence, 544 pixels, and the rear end overlap OR is 32+256, hence, 288 pixels. Therefore, the cutout image data is obtained as follows: 256 pixel width×(544+1024+288).

While an inspection effective region A shown in FIG. 16 is defined, according to the method of the embodiment set forth in FIG. 3, the inspection effective region can be extended to region B by the above method. The inspection effective region B ranges from the forward boundary of cell 2 to the rear boundary of cell 6 and the entire regions of the cells 2 and 6 including the boundaries of the unit image can be inspected.

As discussed hereinbefore, to perform defect inspection for objects by visual inspection apparatus, the disclosed system that employs a plurality of processors to perform parallel processing of serial image data is able to perform continuously cell to cell comparison inspection, die to die comparison inspection, and cell-to-cell and die-to-die hybrid comparison inspection, while satisfying real time processing demand at a high speed and in a great volume.

The present invention can provide an image processing apparatus for wafer inspection tool that is able to perform continuously, cell to cell comparison inspection, die to die comparison inspection, and cell-to-cell and die-to-die hybrid comparison inspection, employing a plurality of processors.

What is claimed is:

1. An image processing apparatus for wafer inspection tool to perform visual inspection by die to die comparison and cell to cell comparison, using serial image data of an object which has a plurality of dice each having an identical circuitry pattern formed thereon or a plurality of cells on a die each having an identical circuitry pattern formed thereon, said image processing apparatus comprising:
    a plurality of processors for performing parallel processing;
    means for cutting serial image data into a plurality of cutout image data, said cutout image data including a forward end overlap and a rear end overlap at cutout boundaries and having a predetermined data size;
    means for distributing said cutout image data to said plurality of processors; and
    means for assembling results of processing performed by said plurality of processors,
    wherein said forward end overlap is the sum of an overlap margin for operation processing and the maximum cell pitch of a plurality of cell pitches in cell to cell comparison inspection, and said rear end overlap is an overlap margin for operation processing.

2. The image processing apparatus for wafer inspection tool according to claim 1, wherein said means for cutting serial image data has a function to cut out said cutout image data including said forward end overlap and said rear end overlap according to a line address of head position of cutout image data and a cutout width, wherein said line address is less by said forward end overlap than a boundary between said image data and the preceding image data and said cutout width is the sum of said cutout image data, forward end overlap and rear end overlap.

3. The image processing apparatus for wafer inspection tool according to claim 2, further comprising:
    means for storing a pre-calculated line address of head position of said cutout image data and a pre-calculated cutout width of said cutout image data into a memory; and
    means for comparing a line address that is now counted with said pre-calculated line address stored in said memory.

4. The image processing apparatus for wafer inspection tool according to claim 1, wherein said forward end overlap is greater than a maximum cell pitch size.

5. The image processing apparatus for wafer inspection tool according to claim 1, wherein each of said processor has a function program which is configured to perform cell to cell comparison inspection by using said cutout image data distributed to said processor.

6. The image processing apparatus for wafer inspection tool according to claim 1, wherein each of said processor has a function program which is configured to perform die to die comparison inspection by using said cutout image data distributed to said processor.

7. The image processing apparatus for wafer inspection tool according to claim 1, wherein said forward end overlap is greater than the double of said pitch of the cell in cell to cell comparison inspection and said rear end overlap is greater than said pitch of the cell.

8. An image processing apparatus for wafer inspection tool to perform visual inspection by die to die comparison and cell to cell comparison, using serial image data of an object which has a plurality of dice each having an identical circuitry pattern formed thereon or a plurality of cells on a die each having an identical circuitry pattern formed thereon, said image processing apparatus comprising:
    a plurality of processors for performing parallel processing;
    means for cutting serial image data into a plurality of cutout image data, said cutout image data including a forward end overlap and a rear end overlap at cutout boundaries and having a predetermined data size;
    means for distributing said cutout image data to said plurality of processors; and
    means for assembling results of processing performed by said plurality of processors,
    wherein said forward end overlap is the sum of an overlap margin for operation processing and the double of a cell pitch size in cell to cell comparison inspection, and said rear end overlap is the sum of an overlap margin for operation processing and the cell pitch size.

* * * * *